United States Patent
Shen

(10) Patent No.: US 10,341,057 B2
(45) Date of Patent: Jul. 2, 2019

(54) DETERMINING A HARQ-ACK RESPONSE CODEBOOK IN A WIRELESS COMMUNICATION SYSTEM

(71) Applicant: Lenovo Innovations Limited (Hong Kong), Hong Kong (CN)

(72) Inventor: Zukang Shen, Beijing (CN)

(73) Assignee: Lenovo Innovations Limited (Hong Kong), Hong Kong (CN)

( * ) Notice: Subject to any disclaimer, the term of this patent is extended or adjusted under 35 U.S.C. 154(b) by 0 days.

(21) Appl. No.: 15/752,560

(22) PCT Filed: Aug. 14, 2015

(86) PCT No.: PCT/CN2015/086928
§ 371 (c)(1),
(2) Date: Feb. 13, 2018

(87) PCT Pub. No.: WO2017/028001
PCT Pub. Date: Feb. 23, 2017

(65) Prior Publication Data
US 2018/0241510 A1    Aug. 23, 2018

(51) Int. Cl.
*H04L 1/18*   (2006.01)
*H04L 1/16*   (2006.01)
(Continued)

(52) U.S. Cl.
CPC .............. *H04L 1/1621* (2013.01); *H04L 1/18* (2013.01); *H04L 1/1812* (2013.01);
(Continued)

(58) Field of Classification Search
None
See application file for complete search history.

(56) References Cited

U.S. PATENT DOCUMENTS

2013/0034029 A1   2/2013   Lee
2018/0167932 A1*  6/2018   Papasakellariou ........ H04L 1/00

FOREIGN PATENT DOCUMENTS

WO    2013169167 A1   11/2013

OTHER PUBLICATIONS

Huawei, "HACK-ACK Codebook Size Determination and Fallback Operation for Up to 32 Component Carriers" (Year: 2015).*

(Continued)

*Primary Examiner* — Ayanah S George
(74) *Attorney, Agent, or Firm* — Kunzler Bean & Adamson

(57) ABSTRACT

Apparatuses, methods, and systems are disclosed for determining a hybrid automatic repeat request acknowledgement (HARQ-ACK) codebook. One apparatus includes a processor and a memory that stores code executable by the processor. The code, in various embodiments, determines a set of aggregated serving cells. The code groups the aggregated serving cells into a set of cell groups. In a further embodiment, the code determines, for an uplink subframe, a set of subframes for which a corresponding HARQ-ACK is to be transmitted in the uplink subframe. The code receives a cell-domain downlink assignment indicator and a cell-domain total assignment indicator in each downlink control information scheduling a physical downlink shared channel. The code additionally determines a HARQ-ACK codebook for each combination of a cell group and a subframe. The apparatus may include a transmitter that receives the downlink control information.

33 Claims, 11 Drawing Sheets

(51) Int. Cl.
*H04L 5/00* (2006.01)
*H04W 72/04* (2009.01)
*H04L 5/14* (2006.01)

(52) U.S. Cl.
CPC .......... *H04L 1/1861* (2013.01); *H04L 1/1864* (2013.01); *H04L 5/0055* (2013.01); *H04W 72/0406* (2013.01); *H04L 5/14* (2013.01)

(56) References Cited

OTHER PUBLICATIONS

Huawei et al., "HARQ-ACK Codebook size determination and fallback operation for up to 32 component carriers", 3GPP TSG RAN WG1 Meeting #81, R1-152463, May 25-29, 2015, pp. 1-4.

* cited by examiner

250

| C-DAI (or C-TAI) 252 | $I_{C-DAI}$ (or $I_{C-TAI}$) 254 | Accumulated (or total) number of scheduled serving cells 256 |
|---|---|---|
| 00 | 1 | 1 or 5 or 9 or 13 or 17 or 21 or 25 or 29 |
| 01 | 2 | 2 or 6 or 10 or 14 or 18 or 22 or 26 or 30 |
| 10 | 3 | 3 or 7 or 11 or 15 or 19 or 23 or 27 or 31 |
| 11 | 4 | 4 or 8 or 12 or 16 or 20 or 24 or 28 or 32 |

FIG. 2B

DETERMINING A HARQ-ACK RESPONSE CODEBOOK IN A WIRELESS COMMUNICATION SYSTEM

FIELD

The subject matter disclosed herein relates generally to wireless communications and more particularly relates to feedback generated in response to received downlink transport blocks in a wireless communication system.

BACKGROUND

The following abbreviations are herewith defined, at least some of which are referred to within the following description.

3GPP: Third Generation Partnership Project
ACK: Positive Acknowledgement
ARQ: Automatic Repeat Request
C-DAI: Cell-Domain Downlink Assignment Indicator
C-TAI: Cell-Domain Total Assignment Indicator
CA: Carrier Aggregation
CB: Codebook
CBS: Codebook Size
CC: Component Carriers
CG: Cell Group
DCI: Downlink Control Information
DL: Downlink
eNB: Evolved Node B
FDD: Frequency-Division Duplex
HARQ: Hybrid Automatic Repeat Request
HARQ-ACK: Hybrid Automatic Repeat Request Acknowledgment
LSB: Least Significant Bit
LTE: Long Term Evolution
MCS: Modulation and Coding Scheme
MSB: Most Significant Bit
NAK: Negative Acknowledgement
OFDM: Orthogonal Frequency Division Multiplexing
PCell: Primary Cell
PDCCH: Physical Downlink Control Channel
PDSCH: Physical Downlink Shared Channel
PUCCH: Physical Uplink Control Channel
PUSCH: Physical Uplink Shared Channel
RRC: Radio Resource Control
SC-FDMA: Single Carrier Frequency-Division Multiple Access
SCell: Secondary Cell
TB: Transport Block
TDD: Time-Division Duplex
UE: User Entity/Equipment (Mobile Terminal)
UL: Uplink
UL/DL: Uplink/Downlink
WiMAX: Worldwide Interoperability for Microwave Access In wireless communication networks, for example, in LTE systems, error-control feedback is generated in response to received downlink (DL) transport blocks (TBs). This feedback supports error-control procedures, such as hybrid ARQ (HARQ), in the downlink. A user equipment (UE) configured with multiple serving cells in the DL, generates error-control feedback for each of the multiple serving cells. In certain wireless communication networks, such as those conforming to 3GPP LTE Release 8 and onwards, the DL TBs are carried on a Physical Downlink Shared Channel (PDSCH). Depending on configuration, an LTE system transmits a maximum of two TBs on the PDSCH in one serving cell and in a single subframe. HARQ acknowledgement (HARQ-ACK), as used herein, represents collectively the Positive Acknowledge (ACK) and the Negative Acknowledge (NAK) feedback to a received TB. ACK means a TB is correctly received, while NAK means a TB is erroneously received.

Many wireless communication networks also support carrier aggregation (CA). For example, LTE systems conforming to 3GPP LTE Release 10 and later support this feature. In CA, a plurality of component carriers (CC) are aggregated at the UE in order to increase the bandwidth, and thus improve data rate. At most 5 serving cells can be aggregated in the DL in LTE systems conforming to 3GPP LTE Releases 10-12. The number and set of aggregated serving cells is configured by higher layer signaling, for example via radio resource control (RRC) layer signaling. Within one subframe, a UE can receive TBs on multiple serving cells, which increases the UE's data rate.

The HARQ-ACK feedback bits corresponding to the PDSCH are transmitted either on the Physical Uplink Control Channel (PUCCH) or on the Physical Uplink Shared Channel (PUSCH). For a frequency-division duplex (FDD) LTE system, the HARQ-ACK bits corresponding to PDSCH received in subframe n−4 are transmitted in subframe n. For a time-division duplex (TDD) LTE system, the HARQ-ACK bits corresponding to PDSCH received in subframe n−k, where k belongs to the downlink-association set K, is transmitted in subframe n. Note that for LTE-TDD, the elements in set K depends on the TDD uplink/downlink (UL/DL) configuration, as well as the subframe index n. Table 1 depicts exemplary downlink-association sets K, for different combinations of TDD UL/DL configurations and subframes n.

TABLE 1

Downlink-association set K: $\{k_0, k_1, \ldots k_{M-1}\}$ for TDD

| UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

For a UE configured with multiple serving cells in the DL, when it needs to transmit HARQ-ACK feedback in an UL subframe, the UE needs to determine the HARQ-ACK codebook, i.e., the set of HARQ-ACK feedback bits to be transmitted in the UL subframe. It is important that the eNB and the UE have the same understanding on the HARQ-ACK codebook size as well as the HARQ-ACK feedback bit ordering, such that the HARQ-ACK feedback can be reliably received at the eNB side.

For an LTE-FDD system conforming to 3GPP LTE Releases 10-12, the HARQ-ACK codebook size is determined based on the number of configured serving cells and the transmission mode configured for each serving cell. For an LTE-TDD system conforming to 3GPP LTE Releases 10-12, the HARQ-ACK codebook size is determined based on the number of configured serving cells, the transmission mode configured for each subframe, and the set K associated with the UL subframe n in which the HARQ-ACK shall be transmitted. Multiple transmission modes are defined by 3GPP LTE, where some transmission mode supports transmission of at most one TB in a DL subframe on a serving cell while other transmission mode supports transmission of at most two TBs in a DL subframe on a serving cell. While this solution works for small sets of aggregated serving cells (e.g., five serving cells or less), the current solution becomes unwieldy for larger sets of aggregated serving cells (e.g., 32 serving cells or more).

Further, when HARQ-ACK is transmitted on PUCCH, the PUCCH transmission power for HARQ-ACK is determined based on the number of information bearing HARQ-ACK feedback, instead of the HARQ-ACK codebook size determined based on the number of configured serving cells.

BRIEF SUMMARY

Apparatuses for determining a HARQ-ACK codebook for carrier aggregation in a wireless communication system are disclosed. Methods and systems also perform the functions of the apparatus. In one embodiment, the apparatus includes a user equipment having a radio transceiver that communicates over a mobile telecommunications network, a processor, and a memory that stores code executable by the processor. The code, in various embodiments, determines a set of aggregated serving cells. In a further embodiment, the code groups the aggregated serving cells into a set of cell groups. The code may also determines, for an uplink (UL) subframe, a set of subframes for which a corresponding hybrid automatic repeat request acknowledgement (HARQ-ACK) is to be transmitted in the uplink (UL) subframe. In certain embodiments, the code receives, via the radio transceiver, a cell-domain downlink assignment indicator (C-DAI) and a cell-domain total assignment indicator (C-TAI) in each downlink control information (DCI) scheduling a physical downlink shared channel (PDSCH). The code may further determines a HARQ-ACK codebook based the C-DAI and C-TAI for each combination of a cell group and a subframe, the cell group belonging to the set of cell groups and the subframe belonging to the set of subframes.

In some embodiments, the code concatenates the HARQ-ACK codebooks from all cell groups and all subframes, in response to the set of cell groups containing more than one cell group or the set of subframes containing more than one subframe. In certain embodiments, for a serving cell x of the aggregated serving cells, the corresponding C-DAI indicates an accumulated number of serving cells with PDSCH up to the serving cell x in a subframe and in the cell group containing serving cell x, and wherein the corresponding C-TAI indicates the total number of serving cells with PDSCH in the subframe and in the cell group containing serving cell x, wherein the serving cells in the cell group and in the subframe are ordered according to a pre-determined rule.

In certain embodiments, grouping the aggregated serving cells into cell groups comprises grouping the aggregated serving cells into cell groups based on a maximum number of transport blocks (TBs) transmittable on the PDSCH in a serving cell within a subframe belonging to the set of subframes, wherein the serving cells in the same cell group have the same maximum number of TBs transmittable on the PDSCH. In some embodiments, determining the HARQ-ACK codebook for a combination of a cell group of the set of cell groups and a subframe of the set of subframes based on the C-DAI and C-TAI comprises: determining the HARQ-ACK codebook size for the cell group in the subframe using the C-DAI and the C-TAI for the cell group in the subframe, and determining the HARQ-ACK bit ordering for the cell group in the subframe using the C-DAI for the cell group in the subframe.

In some embodiments, determining the HARQ-ACK codebook size for the cell group in the subframe includes determining a number of serving cells with PDSCH in the subframe and determining a maximum number of transport blocks (TBs) transmitted on a PDSCH in a serving cell of the cell group within the subframe. Determining the HARQ-ACK codebook size for the cell group in the subframe may also include calculating the HARQ-ACK codebook size for the cell group in the subframe as I×A, wherein I is the number of serving cells in the cell group with PDSCH in the subframe, and wherein A is the maximum number of transport blocks (TBs) transmittable on PDSCH in a serving cell of the cell group within the subframe.

In certain embodiments, determining the HARQ-ACK codebook size for the cell group in the subframe includes determining the HARQ-ACK codebook size for the cell group in the subframe based on the number of aggregated serving cells in the cell group and the maximum number of transport blocks (TBs) transmittable on PDSCH in a serving cell of the cell group within the subframe, in response to the number of aggregated serving cells in the cell group being below a certain threshold value, wherein the threshold value is either configured by higher layers or fixed in specification.

In some embodiments, determining the HARQ-ACK bit ordering for the cell group in the subframe includes identifying A-bit indices within the HARQ-ACK codebook for each serving cell in the cell group on which PDSCH was received, wherein A is the maximum number of transport blocks (TBs) transmittable on PDSCH in a serving cell of the cell group in the subframe. Determining the HARQ-ACK bit ordering for the cell group in the subframe may include obtaining A HARQ-ACK feedback bits for each serving cell in the cell group on which PDSCH was received in the subframe. Determining the HARQ-ACK bit ordering for the cell group in the subframe may further include inserting the A HARQ-ACK feedback bits into the codebook at the A-bit indices, for each serving cell in the cell group on which PDSCH was received in the subframe.

The method of a user equipment determining a HARQ-ACK codebook includes determining a set of aggregated serving cells and grouping the aggregated serving cells into a set of cell groups. The method may also include determining, for an uplink (UL) subframe, a set of subframes Y comprising subframes ($y_1$, $y_2$, . . . , $y_M$) for which a corresponding hybrid automatic repeat request acknowledgement (HARQ-ACK) is to be transmitted in the uplink (UL) subframe. The method may further include receiving a cell-domain downlink assignment indicator (C-DAI) and a cell-domain total assignment indicator (C-TAI) in each downlink control information (DCI) scheduling a physical downlink shared channel (PDSCH). Additionally, the method may include determining a HARQ-ACK codebook based the C-DAI and C-TAI for each combination of a cell group and a subframe, the cell group belonging to the set of cell groups and the subframe belonging to the set of subframes.

In some embodiments, the method further includes concatenating the HARQ-ACK codebooks from all cell groups and all subframes, in response to the set of cell groups containing more than one cell group or the set of subframes Y containing more than one subframe. In certain embodiments, for a serving cell x of the aggregated serving cells, the corresponding C-DAI indicates an accumulated number of serving cells with PDSCH up to the serving cell x in a subframe $y_m$ and in the cell group containing serving cell x, and wherein the corresponding C-TAI indicates the total number of serving cells with PDSCH in the subframe $y_m$ and in the cell group containing serving cell x, wherein the serving cells in the cell group and in the subframe $y_m$ are ordered according to a pre-determined rule.

In some embodiments, grouping the aggregated serving cells into cell groups comprises grouping the aggregated serving cells into cell groups based on a maximum number of transport blocks (TBs) transmittable on the PDSCH in a serving cell within a subframe $y_m$, wherein the serving cells in the same cell group have the same maximum number of TBs transmittable on the PDSCH. In further embodiments, determining the HARQ-ACK codebook for a combination of a cell group of the set of cell groups and a subframe of the set of subframes based on the C-DAI and C-TAI comprises: determining the HARQ-ACK codebook size for the cell group in the subframe using the C-TAI and the C-DAI for the cell group in the subframe, and determining the HARQ-ACK bit ordering for the cell group in the subframe using the C-DAI for the cell group in the subframe.

In some embodiments, determining the HARQ-ACK codebook size for the cell group in the subframe includes obtaining a value Z, denoting the number of serving cell pairs (g', g") with $I_{C\text{-}DAI,g"} \le I_{C\text{-}DAI,g'}$, wherein g'<g" and serving cell j(g') and j(g") are two serving cells in the cell group on which PDSCH is received in the subframe and there is no other g'<g'''<g" in the cell group such that PDSCH is received on serving cell j(g''') in the subframe, and wherein $I_{C\text{-}DAI,g}$ is the value of the C-DAI corresponding to the serving cell j(g) in the subframe, and the serving cell index for a serving cell in the cell group is denoted as j(g) with $1 \le g \le |CG|$ and |CG| is the number of serving cells in the cell group. Determining the HARQ-ACK codebook size for the cell group in the subframe may also include setting the value of K=Z+1 in response to U>Z×2 (Q)+$I_{C\text{-}TAI}$ and setting the value of K=Z otherwise, wherein U is the number of received PDSCH in the cell group and in the subframe, wherein the C-DAI and C-TAI in the DCI comprises Q bits each, and $I_{C\text{-}TAI}$ is the value of the C-TAI corresponding to the serving cell(s) in the cell group. Determining the HARQ-ACK codebook size for the cell group in the subframe may further include calculating the HARQ-ACK codebook size for the cell group in the subframe as [K×2 (Q)+$I_{C\text{-}TAI}$]×A, wherein A is the maximum number of transport blocks (TBs) transmittable on PDSCH in a serving cell of the cell group within the subframe.

In certain embodiments, determining the HARQ-ACK bit ordering for the cell group in the subframe includes setting the value of $K_g$ as the number of serving cell pairs (g', g") with $I_{C\text{-}DAI,g"} \le I_{C\text{-}DAI,g'}$, wherein g'<g"≤g and serving cell j(g') and j(g") are two serving cells in the cell group on which a PDSCH is received in the subframe and there is no other serving cell j(g''') in the cell group, wherein g'<g'''<g", such that a PDSCH is received on serving cell j(g''') in the subframe, and wherein PDSCH is received on serving cell j(g) in the subframe, and the serving cell index for a serving cell in the cell group is denoted as j(g) with $1 \le g \le |CG|$ and |CG| is the number of serving cells in the cell group. Determining the HARQ-ACK bit ordering for the cell group in the subframe may also include inserting the A HARQ-ACK feedback bits corresponding to the PDSCH received on serving cell j(g) in the (($K_g \times 2$ $Q_{C\text{-}DAI}+I_{C\text{-}DAI,g}-1) \times A+1$)-th to (($K_g \times 2$ $Q_{C\text{-}DAI}+I_{C\text{-}DAI,g}) \times A$)-th bit position, wherein A is the maximum number of transport blocks (TBs) transmittable on PDSCH in a serving cell of the cell group within the subframe.

In some embodiments, determining the HARQ-ACK codebook size for the cell group in the subframe includes, for each subframe $y_m$ in the set Y, obtaining a value $Z_m$ denoting the number of serving cell pairs (g', g") in subframe $y_m$ with $Q_{C\text{-}DAI,g"}+I_{C\text{-}DAI,g"}$, wherein g'<g" and serving cell j(g') and j(g") are two serving cells in the cell group on which PDSCH is received in subframe $y_m$ and there is no other g'<g'''<g" in the cell group such that PDSCH is received on serving cell j(g''') in subframe $y_m$, and wherein $I_{C\text{-}DAI,g}$ is the value of the C-DAI corresponding to the serving cell j(g) in subframe $y_m$, and the serving cell index for a serving cell in the cell group is denoted as j(g) with $1 \le g \le |CG|$ and |CG| is the number of serving cells in the cell group. Determining the HARQ-ACK codebook size for the cell group in the subframe may also include for each subframe $y_m$ in the set Y, setting the value of $K_m=Z_m+1$ in response to $U_m > Z_m \times 2$ (Q)+$I_{C\text{-}TAI,m}$, and setting the value of $K_m=Z_m$ otherwise, wherein $U_m$ is the number of received PDSCH in the cell group and in subframe $y_m$, wherein the C-DAI and C-TAI in the DCI comprises Q bits each, and $I_{C\text{-}TAI,m}$ is the value of C-TAI in the cell group and in subframe $y_m$. Determining the HARQ-ACK codebook size for the cell group in the subframe may further include determining the HARQ-ACK codebook size for the cell group in the subframe as $$\max_{m=1,2,\ldots,M} (K_m \times 2 \wedge Q + I_{C\_TAI,m}) \times A,$$

wherein A is the maximum number of transport blocks (TBs) transmittable on PDSCH in a serving cell of the cell group within a subframe in the set Y.

In some embodiments, determining the HARQ-ACK codebook size for the cell group in the subframe comprises determining the HARQ-ACK codebook size for the cell group in the subframe based on the number of aggregated serving cells in the cell group and the maximum number of transport blocks (TBs) transmittable on PDSCH in a serving cell of the cell group within the subframe, in response to the number of aggregated serving cells in the cell group being below a certain threshold value, wherein the threshold value is either configured by higher layers or fixed in specification. In further embodiments, the method includes setting a negative acknowledgment in each HARQ-ACK feedback bit position of the set of HARQ-ACK feedback bit positions for which there is no corresponding received PDSCH. The set of subframes for which a corresponding HARQ-ACK is to be transmitted may be based on a duplex mode and an uplink/ downlink (UL/DL) configuration of each serving cell in the set of aggregated serving cells.

Another apparatus may include a network equipment having a radio transceiver configured to communicate with at least one user equipment over a mobile telecommunications network, a processor, and a memory that stores code executable by the processor. The code, in various embodiments, determines a set of serving cells aggregated for a user equipment. In a further embodiment, the code groups the aggregated serving cells into a set of cell groups. The code may also transmit, via the radio transceiver, a cell-domain downlink assignment indicator (C-DAI) and a cell-domain total assignment indicator (C-TAI) in each downlink control information (DCI) scheduling a physical downlink shared channel (PDSCH) for the user equipment. In certain embodiments, the code determines, for an uplink (UL) subframe, a set of subframes for which a corresponding hybrid automatic repeat request acknowledgement (HARQ-ACK) is to be transmitted by the user equipment in the UL subframe. The code may further determine a HARQ-ACK codebook for each combination of a cell group and a subframe, the cell group belonging to the set of cell groups and the subframe belonging to the set of subframes.

In certain embodiments, for a serving cell x of the aggregated serving cells, the corresponding C-DAI indicates an accumulated number of serving cells with PDSCH for the user equipment up to the serving cell x in a subframe and in the cell group containing serving cell x, and wherein the corresponding C-TAI indicates the total number of serving cells with PDSCH for the user equipment in the subframe and in the cell group containing serving cell x, wherein the serving cells in the cell group and in the subframe are ordered according to a pre-determined rule. In further embodiments, grouping the aggregated serving cells into cell groups comprises grouping the aggregated serving cells into cell groups based on a maximum number of transport blocks (TBs) transmittable to the user equipment on the PDSCH in a serving cell within a subframe belonging to the set of subframes, wherein the serving cells in the same cell group have the same maximum number of TBs transmittable to the first user equipment on the PDSCH.

In some embodiments, determining the HARQ-ACK codebook for a combination of a cell group and a subframe comprises: determining the HARQ-ACK codebook size for the cell group in the subframe, and determining the HARQ-ACK bit ordering for the cell group in the subframe. In certain embodiments, determining the HARQ-ACK codebook size for the cell group in the subframe comprises determining the HARQ-ACK codebook size for the cell group in the subframe based on the number of aggregated serving cells in the cell group and the maximum number of transport blocks (TBs) transmittable to the user equipment on PDSCH in a serving cell of the cell group within the subframe, in response to the number of aggregated serving cells in the cell group being below a certain threshold value, wherein the threshold value is either configured by higher layers or fixed in specification.

In some embodiments, determining the HARQ-ACK codebook size for the cell group in the subframe includes determining a number of serving cells on which PDSCH is transmitted to the user equipment in the subframe. Determining the HARQ-ACK codebook size for the cell group in the subframe may also include determining a maximum number of transport blocks (TBs) transmittable to the user equipment on a PDSCH in a serving cell of the cell group within the subframe. Determining the HARQ-ACK codebook size for the cell group in the subframe may further include calculating the HARQ-ACK codebook size for the cell group in the subframe as I×A, wherein I is the number of serving cells in the cell group with PDSCH for the user equipment in the subframe, and wherein A is the maximum number of TBs transmittable to the user equipment on PDSCH in a serving cell of the cell group within the subframe.

In certain embodiments, determining the HARQ-ACK bit ordering for the cell group in the subframe includes identifying A-bit indices within the HARQ-ACK codebook for each serving cell in the cell group on which PDSCH was transmitted to the user equipment, wherein A is the maximum number of transport blocks (TBs) transmittable to the user equipment on PDSCH in a serving cell of the cell group in the subframe.

Another method for determining a HARQ-ACK codebook includes determining a set of serving cells aggregated for a user equipment and grouping the aggregated serving cells into a set of cell groups. The method includes transmitting a cell-domain downlink assignment indicator (C-DAI) and a cell-domain total assignment indicator (C-TAI) in each downlink control information (DCI) scheduling a physical downlink shared channel (PDSCH) for the user equipment. The method further includes determining, for an uplink (UL) subframe, a set of subframes Y comprising subframes $(y_1, y_2, \ldots, y_M)$ for which a corresponding hybrid automatic repeat request acknowledgement (HARQ-ACK) is to be transmitted in the uplink (UL) subframe by the user equipment in the UL subframe. Additionally, the method includes determining a HARQ-ACK codebook for each combination of a cell group and a subframe $y_m$, the cell group belonging to the set of cell groups.

In certain embodiments, for a serving cell x of the aggregated serving cells, the corresponding C-DAI indicates an accumulated number of serving cells with PDSCH for the user equipment up to the serving cell x in a subframe $y_m$ and in the cell group containing serving cell x, and wherein the corresponding C-TAI indicates the total number of serving cells with PDSCH for the user equipment in the subframe $y_m$ and in the cell group containing serving cell x, wherein the serving cells in the cell group and in the subframe $y_m$ are ordered according to a pre-determined rule. In further embodiments, grouping the aggregated serving cells into cell groups comprises grouping the aggregated serving cells into cell groups based on a maximum number of transport blocks (TBs) transmittable to the user equipment on the PDSCH in a serving cell within a subframe $y_m$, wherein the serving cells in the same cell group have the same maximum number of TBs transmittable to the user equipment on the PDSCH.

In some embodiments, determining the HARQ-ACK codebook for a combination of a cell group and a subframe includes determining the HARQ-ACK codebook size for the cell group in the subframe and determining the HARQ-ACK bit ordering for the cell group in the subframe. In certain embodiments, determining the HARQ-ACK codebook size for the cell group in the subframe comprises determining the HARQ-ACK codebook size for the cell group in the subframe based on the number of aggregated serving cells in the cell group and the maximum number of transport blocks (TBs) transmittable to the user equipment on PDSCH in a serving cell of the cell group within the subframe, in response to the number of aggregated serving cells in the cell group being below a certain threshold value, wherein the threshold value is either configured by higher layers or fixed in specification.

In some embodiments, determining the HARQ-ACK codebook size for the cell group in the subframe includes determining a number of serving cells on which PDSCH is transmitted to the user equipment in the subframe. Determining the HARQ-ACK codebook size for the cell group in the subframe may also include determining a maximum number of transport blocks (TBs) transmittable to the user equipment on a PDSCH in a serving cell of the cell group within the subframe. Determining the HARQ-ACK codebook size for the cell group in the subframe may further include calculating the HARQ-ACK codebook size for the cell group in the subframe as I×A, wherein I is the number of serving cells in the cell group with PDSCH for the user equipment in the subframe, and wherein A is the maximum number of TBs transmittable to the user equipment on PDSCH in a serving cell of the cell group within the subframe.

In certain embodiments, determining the HARQ-ACK bit ordering for the cell group in the subframe includes identifying A-bit indices within the HARQ-ACK codebook for each serving cell in the cell group on which PDSCH was transmitted to the user equipment, wherein A is the maximum number of transport blocks (TBs) transmittable to the user equipment on PDSCH in a serving cell of the cell group in the subframe.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2B is a block diagram illustrating another embodiment of a table useful for determining a HARQ-ACK codebook;

DETAILED DESCRIPTION

Figure 1:
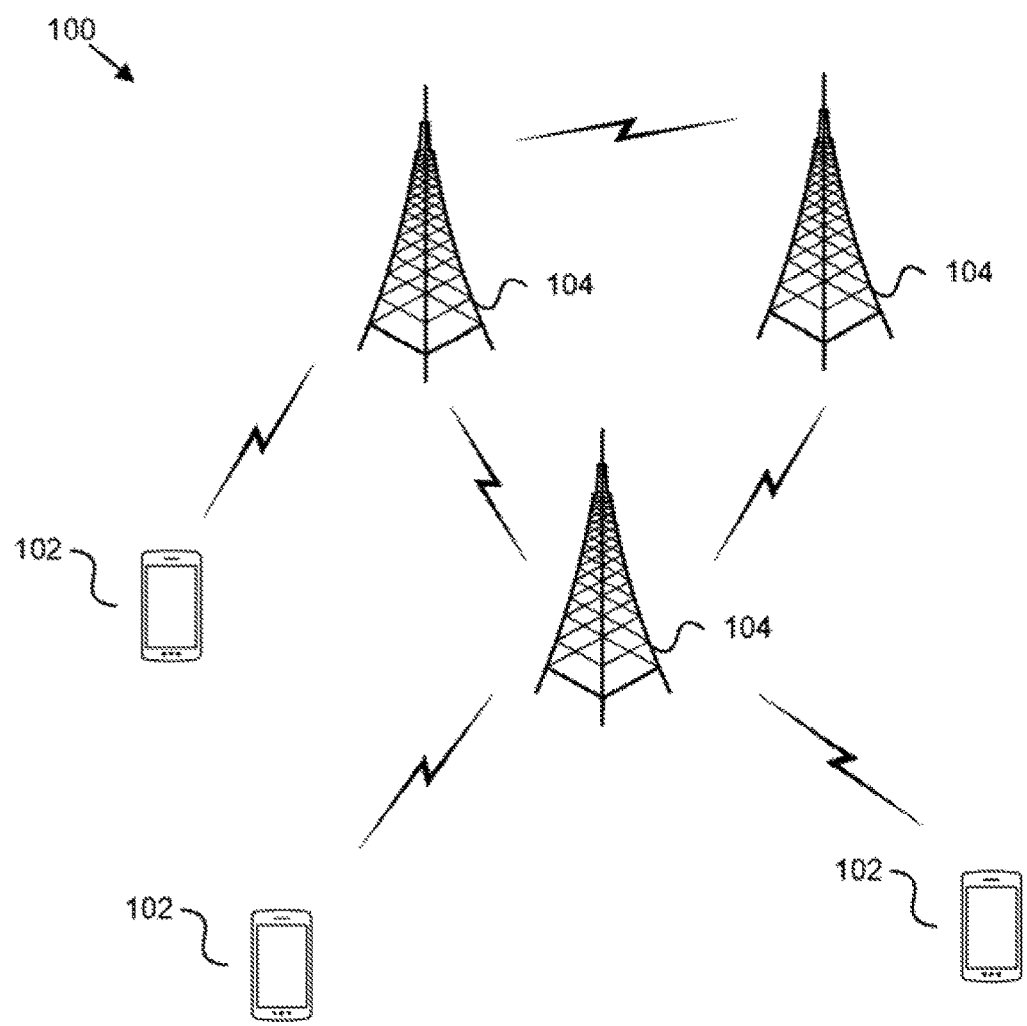
FIG. 1 is a schematic block diagram illustrating one embodiment of a wireless communication system for determining a HARQ-ACK codebook.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the disclosed embodiments describe determining a HARQ-ACK codebook in a system where a plurality of serving cells may be aggregated by a user equipment. 3GPP LTE Release 13 is working toward the support of aggregating up to 32 serving cells in the DL. The number and set of aggregated serving cells may be configured by higher layer signaling. Given the larger number of aggregated serving cells compared to 3GPP Release 12, the number of HARQ-ACK feedback bits to be transmitted in an UL subframe increases to 64 bits for LTE-FDD and at least 128 bits for LTE-TDD. With such a large number of HARQ-ACK bits, linear block codes are no longer the preferred channel coding scheme. Therefore, it has been agreed by 3GPP that convolutional coding is adopted as the channel coding scheme for such a large number of HARQ-ACK feedback bits.

Typically, a Viterbi algorithm is used to decode a block of convolutionally encoded bits. Although the a priori scheduling information can still be used to improve the eNB HARQ-ACK decoding performance when convolutional coding is used, it requires redesign of the Viterbi algorithm, which increases the eNB implementation complexity. Therefore, it cannot be always assumed that the a priori scheduling is used at the eNB side. Consequently, the PUCCH transmission power for HARQ-ACK when HARQ-ACK is transmitted on PUCCH shall be determined based on the HARQ-ACK codebook size. It is therefore important to adaptively change the HARQ-ACK codebook size based on the number of scheduled serving cells, in order to reduce the PUCCH transmission power for HARQ-ACK.

The disclosed embodiments describe adaptively determining the HARQ-ACK codebook size and the HARQ-ACK bit ordering, taking into account of the number of scheduled serving cells in a DL subframe or a set of DL subframes, while ensuring that the eNB and UE have a reliable common understanding on the HARQ-ACK codebook. Two new fields, a cell-domain downlink assignment indicator (C-DAI) and a cell-domain total assignment indicator (C-TAI), are introduced which are included in the DCI.

The C-DAI and C-TAI may be used by the UE to determine the HARQ-ACK codebook size and the HARQ-ACK codebook bit ordering.

Beneficially, the disclosed embodiments allow a wireless communication system to reduce the number of HARQ-ACK feedback bits to be transmitted in an UL subframe, as compared to conventional methods. Further, the disclosed embodiments allow a UE to properly set the transmission power for HARQ-ACK feedback based on the adaptive HARQ-ACK codebook size, while not unnecessarily wasting its transmission power. A further benefit of determining the transmission power for HARQ-ACK based on the adaptive HARQ-ACK codebook size is that no specific decoding algorithm is mandated at the eNB side.

FIG. 1 depicts an embodiment of a wireless communication system 100 for determining a HARQ-ACK codebook. In one embodiment, the wireless communication system 100 includes one or more user equipment (UE) 102 and one or more network equipment 104. Even though a specific number of UEs 102 and network equipment 104 are depicted in FIG. 1, one of skill in the art will recognize that any number of UEs 102 and network equipment 104 may be included in the wireless communication system 100.

In one embodiment, the UEs 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the UEs 102 include wearable devices, such as smart watches, fitness bands, optical head-mounted displays, or the like. Moreover, the UEs 102 may be referred to as subscriber units, mobiles, mobile stations, users, terminals, mobile terminals, fixed terminals, remote units, subscriber stations, user terminals, or by other terminology used in the art. The UEs 102 may communicate directly with one or more of the network equipment 104 via UL communication signals.

The network equipments 104 may be distributed over a geographic region. In certain embodiments, a network equipment 104 may also be referred to as an access point, an access terminal, a base, a base station, a base unit, a Node-B, an enhanced Node-B (eNB), a Home Node-B, a relay node, or by any other terminology used in the art. The network equipments 104 are generally part of a radio access network that includes one or more controllers communicably coupled to one or more corresponding network equipments 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 3GPP LTE protocol, wherein the network equipment 104 transmits using an OFDM modulation scheme on the DL and the UEs 102 transmit on the UL using a SC-FDMA scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

A network equipment 104 serves a number of UEs 102 within a serving area, for example, a cell or a cell sector via a wireless communication link. For example, each network equipment 104 may support a plurality of serving cells, each serving cell including a component carrier upon which wireless signals containing network signaling and/or user data are communicated. The network equipment 104 transmits DL communication signals to serve the UEs 102 in the time, frequency, and/or spatial domain. The network equipment 104 also receives UL communication signals from one or more UEs 102 within the serving cells. For example, the network equipment 104 may receive UL communications from a UE 102 that includes a HARQ-ACK codebook.

In one embodiment, a network equipment 104 may determine multiple serving cells to be aggregated at a UE 102. For example, the base units may allocate resources within multiple serving cells to a single UE 102, wherein the UE 102 aggregates DL signals of the multiple serving cells according to carrier aggregation (CA). The multiple serving cells may include a primary serving cell (PCell) and one or more secondary serving cells (SCell). The network equipment 104 may form one or more DL grant messages to schedule the multiple serving cells. Moreover, the network equipment 104 may provide the DL grant message(s) to the UE 102, for example over the PDCCH transmitted on each of the serving cells. In certain embodiments, the UE 102 may receive an RRC configuration and determine the set of serving cells aggregated for the UE 102. In addition, the UE 102 may determine a subframe to transmit in an UL subframe based on a UL grant message.

The UE 102 is expected to transmit HARQ-ACK feedback for each serving cell scheduled with PDSCH among the aggregated serving cells. To do so, the UE generates and transmits a HARQ-ACK codebook. In order to accurately communicate HARQ-ACK feedback, the UE 102 and the network equipment 104 must have a common understanding of the HARQ-ACK codebook format, including a HARQ-ACK codebook size and a HARQ-ACK codebook bit ordering.

In some embodiments, the UE 102 transmits HARQ-ACK feedback corresponding to a single DL subframe during an UL subframe. In other embodiments, the UE transmits HARQ-ACK feedback corresponding to multiple DL subframes during an UL subframe. For example, consider a UE 102 having N aggregated serving cells (denoted as $x_1, x_2, \ldots, x_N$) and M subframes (denoted as $y_1, y_2, \ldots, y_M$). The UE 102 transmits the HARQ-ACK bits corresponding to the received TBs on these N serving cells in these M subframes in a same UL subframe n. In some embodiments, the set of subframes Y for which a corresponding HARQ-ACK is to be transmitted is based on a duplex mode and an uplink/downlink (UL/DL) configuration of each serving cell in the set of aggregated serving cells. For example, in LTE FDD, M=1. As another example, in LTE TDD, M≥1, where the value of M depends on the TDD UL/DL configuration and the UL subframe index n.

In some embodiments, the N aggregated serving cells are grouped into two groups. This is done by both the UE 102 aggregating the serving cells, and the network equipment 104 receiving HARQ-ACK feedback. One cell group (denoted as $CG_1$) includes all aggregated serving cells configured with a transmission mode that supports transmitting at most one TB on PDSCH in a serving cell and in a subframe. Another cell group (denoted as $CG_2$) includes all aggregated serving cells configured with a transmission mode that supports transmitting a maximum of two TBs on a PDSCH in a serving cell and in a subframe. In some embodiments, a TB may be mapped to a codeword (CW), e.g., a PDSCH TB corresponding to a PDSCH CW. Throughout this disclosure, the terminology TB and CW may be used interchangeably. Consequently, the UE 102 generates one HARQ-ACK feedback bit for each serving cell in $CG_1$ and generates two HARQ-ACK feedback bits for each serving cell in $CG_2$. The necessity of such cell group formation is discussed in greater detail below, with reference to FIG. 8. Additional cell groups may be present in embodiments where the system 100 supports transmitting more than two TBS on a PDSCH in a serving cell and within a subframe.

In an LTE system, the network equipment 104 indicates to the UE 102 that a PDSCH is scheduled using a DL grant transmitted on the Physical Downlink Control Channel (PDCCH). In certain embodiments, the DL grant corresponds to a Downlink Control Information (DCI) format. Different fields may be included in the DL grant to convey information related to a corresponding PDSCH. In some embodiments, the DCI may include other control information.

In one embodiment, a DL grant which schedules PDSCH on a serving cell, denoted as serving cell x, includes a cell-domain downlink assignment indicator (C-DAI) which indicates the accumulated number of scheduled serving cells up to the serving cell x in the current subframe and in the cell group containing serving cell x. The serving cells within the cell group can be ordered based on the corresponding serving cell index. Furthermore, denoted the number of bits for C-DAI comprises as $Q_{C\text{-}DAI}$. A mapping of the $Q_{C\text{-}TAI}$-bit C-DAI to a decimal is referred to herein as $I_{C\text{-}DAI}$. In some embodiments, C-DAI may be mapped to $I_{C\text{-}DAI}$ by converting C-DAI (a binary number) to decimal, and then adding one.

In a further embodiment, the DL grant which schedules PDSCH on the serving cell x also includes a cell-domain total assignment indicator (C-TAI) which indicates the total number of scheduled serving cells in the current subframe and in the cell group containing serving cell x. Furthermore, denoted the number of bits for C-TAI comprises as $Q_{C\text{-}TAI}$. A mapping of the $Q_{C\text{-}TAI}$-bit C-TAI to a decimal is referred to herein as $I_{C\text{-}TAI}$. Although $Q_{C\text{-}DAI}=Q_{C\text{-}TAI}$ in embodiments of this disclosure, in other embodiments $Q_{C\text{-}DAI} \neq Q_{C\text{-}TAI}$. In some embodiments, C-DAI may be mapped to $I_{C\text{-}DAI}$ by converting C-DAI (a binary number) to decimal, and then adding one.

Where the system 100 supports aggregating up to 32 serving cells, 5 bits are needed for C-DAI (or C-TAI) to form a 1-to-1 mapping between the C-DAI (or C-TAI) and the corresponding information, i.e., the accumulated (or total) number of scheduled serving cells. However, in some embodiment, the network equipment 104 may reduce the DL control overhead by reducing the number of bits $Q_{C\text{-}DAI}$ and/or $Q_{C\text{-}TAI}$, as discussed in greater detail below with reference to FIGS. 2A-2B. The value of $Q_{C\text{-}DAI}$ and/or $Q_{C\text{-}TAI}$ can be predetermined (e.g., defined by the wireless communication standard), or configured by higher layers to the UE 102 (e.g., via RRC signaling).

In some embodiment, the UE 102 determines the HARQ-ACK codebook based on the C-DAI and the C-TAI. In one embodiment, the UE 102 determines a HARQ-ACK codebook size based on the C-DAI and the C-TAI. In another embodiment, the UE 102 determines a HARQ-ACK codebook it ordering based on the C-DAI and the maximum number of TBs transmittable on the PDSCH in a serving cell within a subframe.

In certain embodiments, the UE 102 determines HARQ-ACK codebook for each combination of a cell group and subframe. For example, when two cell groups are present and HARQ-ACK response is required for two subframes, the UE 102 determines four HARQ-ACK sub-codebooks: one for the combination of the first cell group and first subframe, one for the combination of the second cell group and first subframe, one for the combination of the first cell group and the second subframe, and one for the combination of the second cell group and the second subframe. Embodiments of the UE 102 determining HARQ-ACK codebooks are discussed in greater detail below, with reference to FIGS. 5-8.

For each combination of a cell group $CG_i$ (where i=1 or 2) and subframe $y_m$ (1≤m≤M) the UE may determine a HARQ-ACK codebook, denoted as $CB_{(i, ym)}$, using C-DAI and C-TAI, as explained in detail below. The network equipment 104 must determine the same HARQ-ACK codebook (e.g., the same codebook size and codebook bit ordering) in order to avoid HARQ-ACK codebook misalignment. In some embodiments, the UE 102 and the network equipment 104 determine the HARQ-ACK codebook using the same methods. In other embodiments, however, the UE 102 and the network equipment 104 may use different methods to determine the HARQ-ACK codebook, as discussed in further detail below.

In some embodiments, UE 102 orders the serving cells in the cell group and in the subframe. In another embodiment, the network equipment 104 orders the serving cells in the cell group and in the subframe. In one embodiment, the UE 102 and/or network equipment 104 orders the serving cells in $CG_i$ according to a serving cell index, denoted as $j_i(g)$. For example, the serving cells in $CG_i$ are ordered from the lowest serving cell index to the highest serving cell index. Thus, for each serving cell g in $CG_i$, $j_i(1)<j_i(2)<j_i(|CG_i|)$, where 1≤g≤|$CG_i$|, and where |$CG_i$| denotes the number of serving cells in $CG_i$. In another embodiment, the serving cells in the cell group and in the same frame are ordered according to a predetermined rule. For example, the serving cell order may be specified by a standard used in the system 100, such as the 3GPP LTE specification. Regardless of who or how the serving cells are ordered, the UE 102 and the network equipment 104 need to have a common understanding of the serving cell order to avoid HARQ-ACK feedback misalignment where the UE 102 sends feedback for a first serving cell, but the network equipment 104 interprets the received feedback as belonging to a second service cell.

The UE 102, in one embodiment, generates a HARQ-ACK codebook $CB_{(i,ym)}$ by determining the codebook size, by determining the codebook bit ordering, and populating the codebook with HARQ-ACK feedback based on the bit ordering. The codebook size for the codebook $CB_{(i,ym)}$, denoted $CBS_{(i,ym)}$, is based on the number of TBs transmittable on PDSCH in the cell group i and on the total number of serving cells with PDSCH in the subframe $y_m$ and in the cell group i. In certain embodiments, the UE 102 determines the codebook size, $CBS_{(i,ym)}$, using the information conveyed by C-TAI to identify a total number of serving cells with PDSCH in the subframe $y_m$ and in the cell group i. In a further embodiment, the UE 102 may use the information conveyed by C-DAI where $Q_{C\text{-}TAI}$ is less than five, as discussed below in greater detail with reference to FIGS. 2A-2B.

Figure 2A:
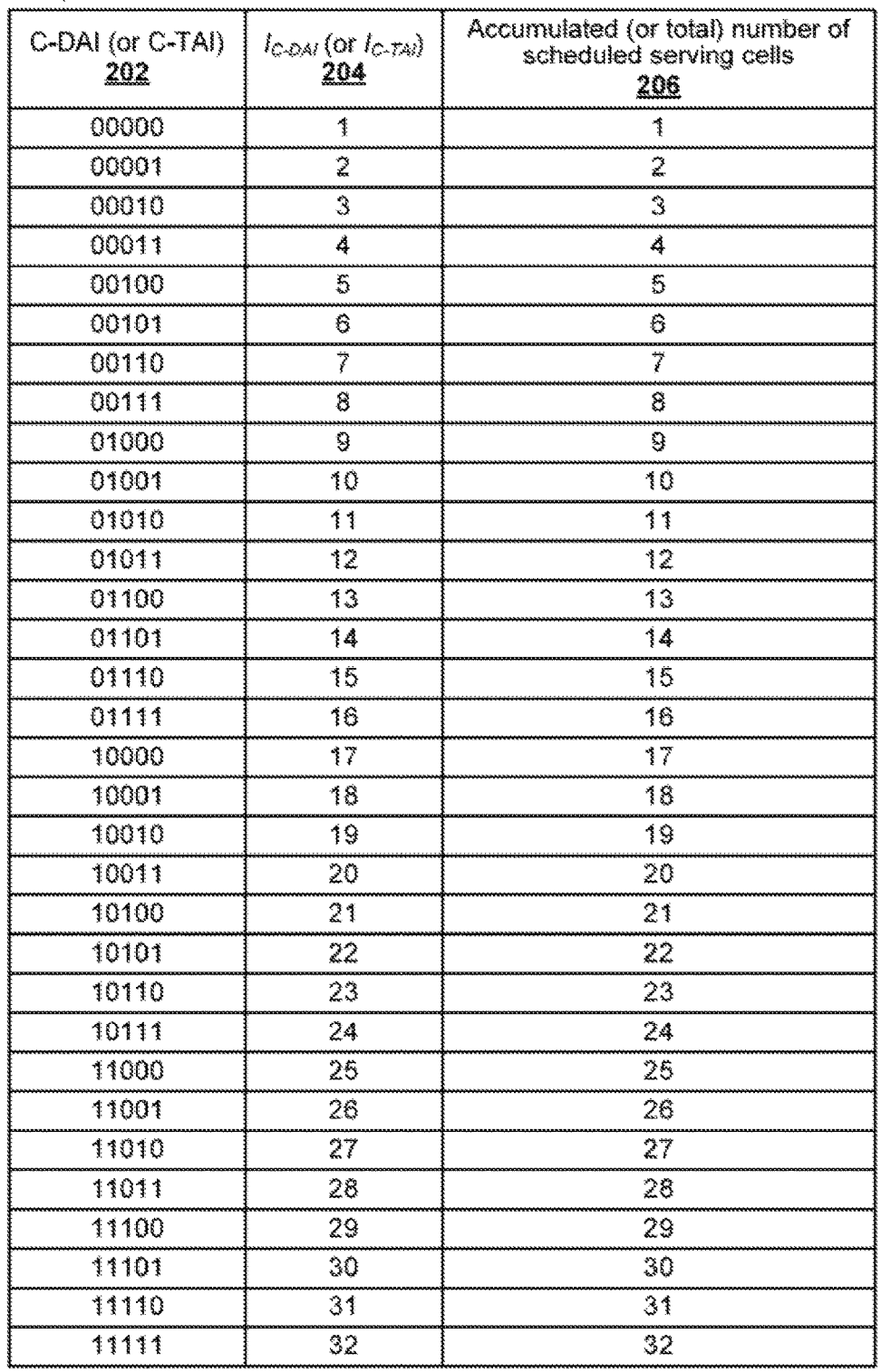
FIG. 2A is a block diagram illustrating one embodiment of a table useful for determining a HARQ-ACK codebook.

FIGS. 2A-2B depict embodiments of tables 200 and 250 for mapping C-DAI and/or C-TAI to the accumulated (or total) number of serving cells in a cell group that are scheduled for PDSCH to a particular UE 102 within the same subframe. For each UE 102, the network equipment 104 may determine a number of serving cells (of those serving cells aggregated at the particular UE 102) scheduled for PDSCH in a subframe. The network equipment 104 may further group the scheduled serving cells into groups based on the number of TBs transmittable on a PDSCH within a subframe. For example, an LTE system may transmit one or two TBs on a PDSCH per subframe based on transmission mode. The network equipment 104 groups those serving cells supporting at most one TB per subframe and per serving cell into a first group (e.g., $CG_1$) and those serving cells supporting at most two TBs per subframe and per serving cell into a second group (e.g., $CG_2$).

The network equipment 104 then determines the C-DAI and the C-TAI based on the accumulated (or total) number of serving cells in a cell group that are scheduled for PDSCH to the particular UE 102 within the same subframe. The C-DAI assigned to a serving cell having PDSCH to the particular UE 102 is based on the serving cell index. The network equipment 104 uses a table, such as table 200 or table 250, to determine the C-DAI (or C-TAI) based on the accumulated (or total) number of serving cells in a cell group that are scheduled for PDSCH to the particular UE 102 within the same subframe. In one embodiment, the network equipment 104 transmits the C-DAI and C-TAI to the UE 102 in each downlink control information (DCI) scheduling a PDSCH for the UE 102.

FIG. 2A depicts one embodiment of a table 200 mapping C-DAI to the accumulated number of serving cells scheduled with a PDSCH to the particular UE 102 in an LTE system capable of aggregated up to 32 serving cells. The same table 200 may also be used to map C-TAI to the total number of serving cells scheduled with a PDSCH to the particular UE 102. The table 200 includes a first column 202 containing 5-bit binary values of C-DAI (or C-TAI), a second column 204 containing $I_{C-DAI}$ (or $I_{C-TAI}$) representing a decimal value mapped to the 5-bit binary value, and a third column 206 denoting the accumulated number of scheduled serving cells corresponding to the C-DAI binary value (or a total number of scheduled serving cells to the particular UE 102 for a C-TAI binary value). While the depicted embodiment shows the decimal values in column 204 as the decimal equivalent to the binary values in column 202, plus one (e.g., convert the binary value to decimal, then add one), other embodiments may use other mappings of the values in column 202.

As depicted, the number of bits for C-DAI and C-TAI, denoted as $Q_{C-DAI}$ and $Q_{C-TAI}$ respectively, equal five for table 200. As the LTE system is capable of aggregated up to 32 serving cells, a 5-bit C-DAI (or C-DAI) results in a one-to-one mapping of C-DAI (or C-TAI) to an accumulated (or total) number of scheduled serving cells to the particular UE 102. However, in order to reduce the DL control overhead, the number of bits for C-DAI and C-TAI, denoted as $Q_{C-DAI}$ and $Q_{C-TAI}$ respectively, can be less than five.

FIG. 2B depicts an embodiment of another table 250 mapping C-DAI to the accumulated number of serving cells scheduled with a PDSCH to the particular UE 102. The same table 250 may also be used to map C-TAI to the total number of serving cells scheduled with a PDSCH to the particular UE 102. As depicted, $Q_{C-DAI} = Q_{C-TAI} = 2$ for table 250. Thus, table 250 maps a 2-bit C-DAI (or C-TAI) to an $I_{C-DAI}$ (of $I_{C-TAI}$) value, and to an accumulated (or total) number of scheduled serving cells to the particular UE 102.

As depicted, the table 250 includes a first column 252 containing 2-bit binary values of C-DAI (or C-TAI), a second column 254 containing $I_{C-DAI}$ (or $I_{C-TAI}$) representing a decimal value mapped to the 2-bit binary value, and a third column 256 denoting the accumulated number of scheduled serving cells to the particular UE 102 corresponding to the C-DAI binary value (or a total number of scheduled serving cells to the particular UE 102 for a C-TAI binary value). While the depicted embodiment shows the decimal values in column 254 as the decimal equivalent to the binary values in column 252, plus one (e.g., convert the binary value to decimal, then add one), other embodiments may use other mappings of the values in column 252.

Unlike table 200, the table 250 with 2-bit C-DAI (or C-TAI) has a one-to-many mapping of C-DAI (or C-TAI) to an accumulated (or total) number of scheduled serving cells to the particular UE 102. For example, a C-DAI with a binary value of "00" may be used to indicate an accumulated number of scheduled serving of one, five, nine, thirteen, seventeen, twenty-one, twenty-five, or twenty-nine to the particular UE 102. The value of C-DAI is calculated from the accumulated number of serving cells scheduled with PDSCH to the particular UE 102, denoted $S_g$, according to Equation 1, below:

$$I_{C-DAI,g} = S_g \bmod (2^{Q_{C-DAI}}) + 1 \quad (1)$$

where $I_{C-DAI,g}$ is the decimal mapping of the C-DAI associated with serving cell g, $S_g$ is the accumulated number of serving cells scheduled with PDSCH to the particular UE 102 up to cell g, and $Q_{C-DAI}$ is the number of bits for C-DAI.

The value of C-TAI is calculated from the accumulated number of serving cells scheduled with PDSCH to the particular UE 102, denoted $S_{max}$, according to Equation 2, below:

$$I_{C-TAI} = S_{max} \bmod (2^{Q_{C-TAI}}) + 1 \quad (2)$$

where $I_{C-TAI}$ is the decimal mapping of the C-TAI associated with the cell group, $S_{max}$ is the total number of serving cells scheduled with PDSCH to the particular UE 102 in the cell group, and $Q_{C-TAI}$ is the number of bits for C-TAI.

The one-to-many mapping of accumulated (or total) number of scheduled serving cells to the particular UE 102 shown in table 250 leads to ambiguity at the UE 102 concerning the accumulated (or total) number of scheduled serving cells. However, this ambiguity may be resolved by the UE 102 upon examining the set of received C-DAI, as described in detail below.

Where, $Q_{C-DAI}$ or $Q_{C-TAI}$ is less than five, the UE 102 may determine the accumulated (or total) number of scheduled serving cells using C-DAI (and C-TAI) by identifying a number of times C-DAI rolls back zero (e.g., the $I_{C-DAI}$ rolls back to one), denoted as $K_g$, from the lowest serving cell index up to either the serving cell index of the serving cell (or up to the last serving cell carrying PDSCH for identifying the total number of scheduled serving cells). Thus, each time the $I_{C-DAI}$ of a serving cell is greater than the $I_{C-DAI}$ of a previous serving cell (going from the lowest serving cell index to the highest serving cell index), then the value of $K_g$ increments (where $K_g$ has an initial value of zero). An exemplary algorithm by which the UE 102 derives $K_g$ is as follows:

Set $K_g = 0$.
From g'=1 to (g−1), identify whether serving cell $j_t(g')$ is scheduled with PDSCH, if so then find the next immediate serving cell $j_t(g'')$ with PDSCH scheduled, i.e., find minimum g'' within [g', g] such that serving cell $j_t(g'')$ is also scheduled with PDSCH.
  If $I_{C-DAI,g''} \le I_{C-DAI,g'}$; increment $K_g$ (e.g., set $K_g = K_g + 1$).
  Else, if $I_{C-DAI,g''} > I_{C-DAI,g'}$, then $K_g = K_g$.
If serving cell $j_t(g')$ is not scheduled with PDSCH, then set $K_g = K_g$ (no change to $K_g$) and increment g'.
End.

For identifying an accumulated number of serving cells up to the serving cell corresponding to a particular C-DAI, set g such that $j_i(g)$ is the serving cell index for the serving cell associated with the particular C-DAI. For identifying a total number of serving cells scheduled with PDSCH, set $g=g_{max}$, such that serving cell $j_i(g_{max})$ is the serving cell with the highest serving cell index upon which a PDSCH is received.

Having calculated a value for $K_g$, the UE 102 determines the accumulated number of serving cells scheduled with PDSCH, denoted as $I_g$ according to Equation 3, below:

$$I_g = K_g \hat{\times} 2 \quad Q_{C\text{-}DAI} + I_{C\text{-}DAI,g} \tag{3}$$

where $Q_{C\text{-}DAI}$ is the number of bits for C-DAI and $I_{C\text{-}DAI,g}$ is the decimal mapping of the C-DAI associated with serving cell g.

Similarly, the UE 102 determines the total number of serving cells scheduled with PDSCH, denoted as $I_{max}$ according to Equation 4, below:

$$I_{max} = K \hat{\times} 2 \quad Q_{C\text{-}TAI} + I_{C\text{-}TAI} \tag{4}$$

where $Q_{C\text{-}TAI}$ is the number of bits for C-TAI and $I_{C\text{-}TAI}$ is the decimal mapping of the C-TAI associated with cell group, $K=K_g$ if $U_{i,m} \leq K_g \hat{\times} 2$ $(Q)+I_{C\text{-}TAI}$ and $K=K_g+1$ otherwise; with $g=g_{max}$ and $U_{i,m}$ denoting the number of received PDSCH in the $CG_i$ and in the subframe $y_m$. As used herein, the values K and $K_g$ are specific to a cell group, $CG_i$, and a subframe $y_m$. Thus, where determining a HARQ-ACK codebook includes determining different values of K and $K_g$ for different cell groups $CG_i$ and/or subframes $y_m$, the specific values K and $K_g$ may be denoted as $K_{i,m}$ and $K_{g,i,m}$, . . . , respectively.

Accordingly, the combination of C-DAI and C-TAI carry sufficient information for the UE 102 to unambiguously identify the accumulated number of serving cells scheduled with PDSCH and the total number of serving cells scheduled with PDSCH, if the UE does not miss more than $\hat{2} \quad Q_{C\text{-}TAI}$ DL grants scheduling PDSCH in the cell group and in the subframe. The UE 102 calculates the HARQ-ACK codebook using the accumulated number of serving cells scheduled with PDSCH and the total number of serving cells scheduled with PDSCH, as described with reference to FIG. 1.

Referring again to FIG. 1, in one embodiment, the UE 102 calculates the codebook size, $CBS_{(i,ym)}$, for the cell group $CG_i$ and within the subframe $y_m$ using Equation 5, below:

$$CBS_{(i,ym)} = [K \hat{\times} 2 \quad (Q_{C\text{-}TAI}) + I_{C\text{-}TAI}] \times A \tag{5}$$

In another embodiment, the UE 102 may calculate the value K by first obtaining a value Z which denotes the number of serving cell pairs (g', g'') with $I_{C\text{-}DAI,g''} \leq I_{C\text{-}TAI,g''}$, wherein g'<g'' and serving cell j(g') and j(g'') are two serving cells in the cell group on which PDSCH is received in the subframe and there is no other g'<g'''<g'' in the cell group such that PDSCH is received on serving cell j(g''') in the subframe. As discussed above, $I_{C\text{-}DAI,g}$ is the value of C-DAI in the DCI scheduling PDSCH on serving cell j(g) in the subframe, wherein the serving cell index for a serving cell in the cell group is denoted as j(g) with $1 \leq g \leq |CG_i|$ and wherein $|CG_i|$ is the number of serving cells in the cell group $CG_i$. Next, the UE 102 sets the value of K=Z+1 in response to $U > Z \hat{\times} 2$ $(Q)+I_{C\text{-}TAI}$ and otherwise sets the value of K=Z. U is the number of received PDSCH in the cell group and in the subframe and $I_{C\text{-}TAI}$ is the value of the T-DAI in the DCI scheduling PDSCH on serving cell(s) in the cell group.

Figure 7:
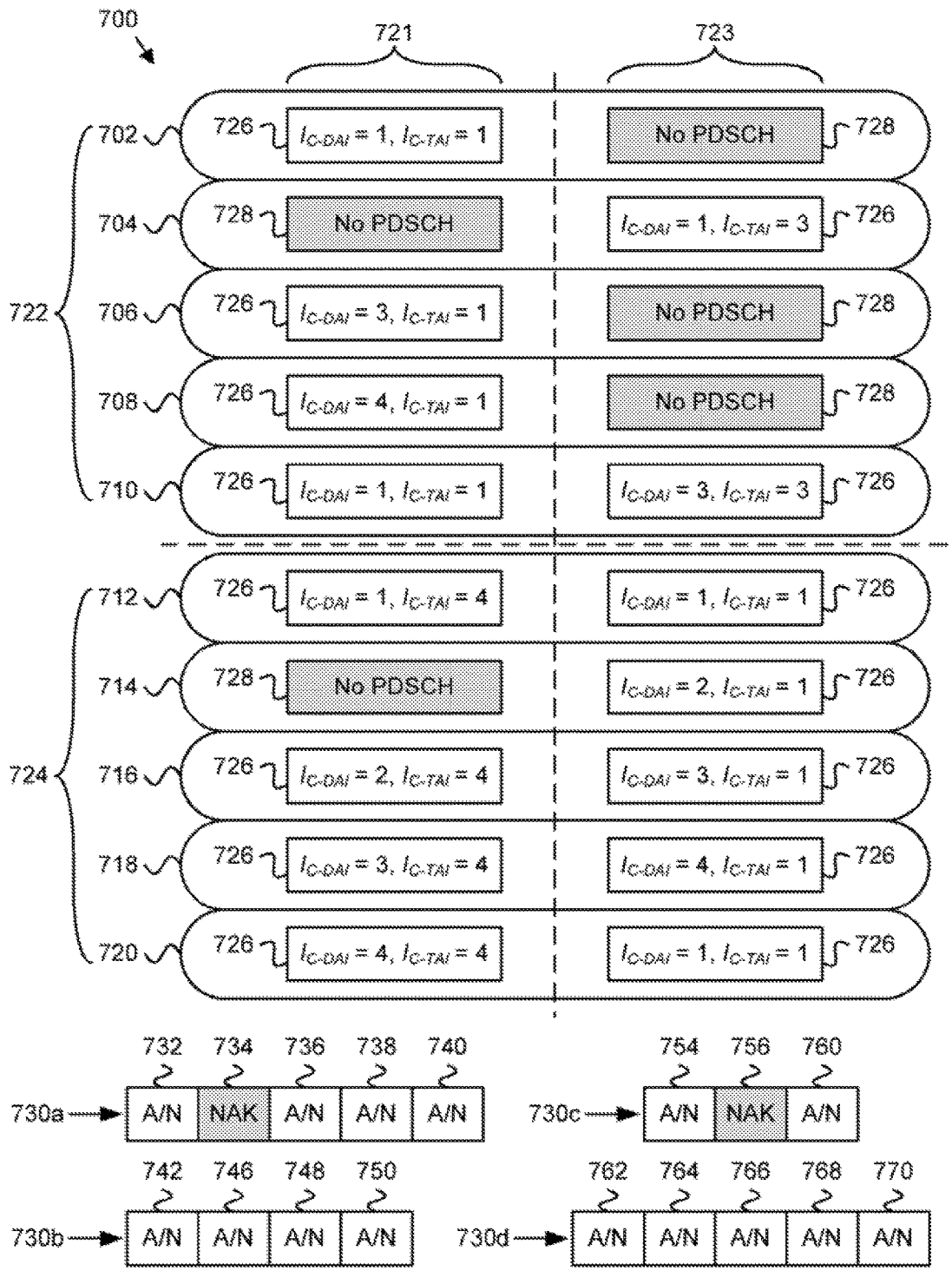
FIG. 7 illustrates one embodiment of a user equipment determining a HARQ-ACK codebook for two cell groups and over two subframes.

In one embodiment, the codebook size may be different for each combination of a cell group $CG_i$ and a subframe $y_m$. FIG. 7 depicts an example of two cell groups and two subframes where each codebook has a different size. In another embodiment, the HARQ-ACK codebook size for $CG_i$ in all the M subframes is the same and is based on the largest codebook size required by the $CG_i$ in all the M subframes. While the HARQ-ACK codebooks for all the M subframes in a particular cell group $CG_i$ will all have a common size, the HARQ-ACK codebooks for a first cell group $CG_1$ may differ in size from the HARQ-ACK codebooks for a second cell group $CG_2$ over the same M subframes.

For example, for each subframe $y_m$ in the set Y, the UE 102 may obtain a value $Z_m$, denoting the number of serving cell pairs (g', g'') in subframe $y_m$ with $I_{C\text{-}DAI,g''} \leq I_{C\text{-}DAI,g''}$. Here, g'<g'' and serving cell j(g') and j(g'') are two serving cells in the cell group on which PDSCH is received in subframe $y_m$ and there is no other g'<g'''<g'' in the cell group such that PDSCH is received on serving cell j(g''') in subframe $y_m$. As discussed above, $I_{C\text{-}DAI,g}$ is the value of the C-DAI corresponding to the serving cell j(g) in subframe $y_m$, and the serving cell index for a serving cell in the cell group is denoted as j(g) with $1 \leq g \leq |CG|$ and $|CG|$ is the number of serving cells in the cell group.

The UE 102 then calculates a value $K_m$ for each subframe $y_m$ in the set Y. In some embodiments, the UE 102 sets the value of $K_m = Z_m+1$ in response to $U_m > Z_m \hat{\times} 2$ $(Q)+I_{C\text{-}TAI,m}$ and setting the value of $K_m = Z_m$ otherwise, wherein $U_m$ is the number of received PDSCH in the cell group and in subframe $y_m$, wherein the C-DAI and C-TAI in the DCI comprises Q bits each. As discussed above, $I_{C\text{-}TAI,m}$ is the value of C-TAI in the cell group and in subframe $y_m$. For example, the UE 102 may calculate the codebook size, $CBS_{(i,ym)}$, for each codebook combination of cell group $CG_i$ and subframe $y_m$ using Equation 6, below:

$$CBS_{(i,ym)} = \max_{m=1,2,\ldots,M} (K_m \times 2 \wedge Q + I_{C\_TAI,m}) \times A \tag{6}$$

Again, in Equation 6, A is the maximum number of transport blocks (TBs) transmittable on PDSCH in a serving cell of the cell group within a subframe in the set Y. Using a common codebook size for all cell group and subframe improves reliability of the common understanding on HARQ-ACK codebook between the network equipment 104 and the UE 102, even if in some cell group $CG_i$ and some subframe $y_m$, the number of serving cells with scheduled PDSCH is small (e.g., 1). For a cell group and a subframe in which the number of scheduled PDSCH is small, it is more likely that the UE 102 misses all scheduled PDSCH in that cell group and in that subframe, which may create misaligned HARQ-ACK codebooks between the UE 102 and the network equipment 104.

In yet another embodiment, the UE 102 determining the HARQ-ACK codebook size, $CBS_{(i,ym)}$, for the cell group $CG_i$ in the subframe $y_m$ based on N, the number of aggregated serving cells N in the cell group, and A, the maximum number of transport blocks (TBs) transmittable on PDSCH in a serving cell of the cell group within the subframe. For example, the HARQ-ACK codebook size may be calculated using Equation 7, below:

$$CBS_{(i,ym)} = N \times A \tag{7}$$

In certain embodiments, the UE 102 determines the codebook size using Equation 7 in response to the number of aggregated serving cells in the cell group being below a certain threshold value. In further embodiments, the threshold value is either configured by higher layers or specified by a standard used in the system 100, such as the 3GPP LTE specification.

In still another embodiment, the UE 102 may determine the HARQ-ACK codebook size, $CBS_{(i,ym)}$, for the cell group $CG_i$ in the subframe $y_m$ based on I, the number of serving cells in the cell group with PDSCH in the subframe, and on A, the maximum number of transport blocks (TBs) transmittable on PDSCH in a serving cell of the cell group within the subframe. For example, the HARQ-ACK codebook size may be calculated using Equation 8, below:

$$CBS_{(i,ym)} = I \times A \qquad (8)$$

For example, where the system 100 uses the 5-bit C-TAI mapping shown in table 200 of FIG. 2A, the number of serving cells in the cell group with PDSCH in the subframe is equal to the value of C-TAI, and thus K is not needed to calculate $CBS_{(i,ym)}$. Still further, the simplified calculation of Equation 8 may be combined with other embodiments of determining the HARQ-ACK codebook size, such as being based on the largest codebook size in a subframe, discussed above.

The network equipment 104 does not require C-DAI and C-TAI to determine the HARQ-ACK codebook size. As the network equipment 104 already knows the number of serving cells scheduled with PDSCH to the particular UE 102 in the cell group (and subframe), number of aggregated serving cells (regardless of PDSCH scheduling) at the UE 102, and the maximum number of transport blocks (TBs) transmittable to the user equipment on PDSCH in a serving cell of the cell group within the subframe. Accordingly, in one embodiment, the network equipment 104 uses Equation 8, above, to calculate the HARQ-ACK codebook size, $CBS_{(i,ym)}$.

In certain embodiments, the network equipment 104 determines the HARQ-ACK codebook bit ordering is based on a pre-determined order of the serving cell scheduled with PDSCH to the particular UE 102 and a maximum number of TBs transmittable to the user equipment on PDSCH in a serving cell and within a single subframe. For example, where A is the maximum number of transport blocks (TBs) transmittable to the user equipment on PDSCH in a serving cell of the cell group in the subframe, each serving cell in the cell group on which PDSCH was transmitted to the user equipment is allocated A-bits within the HARQ-ACK codebook on the scheduled serving cell index, ordered from the lowest to the highest serving cell index.

In some embodiments, the UE 102 determined the bit ordering within codebook $CB_{(i,ym)}$, using the information conveyed by C-DAI. The bit ordering may further be based on A, the maximum number of transport blocks (TBs) transmittable on PDSCH in a serving cell of the cell group within the subframe. For example, where A=1, if PDSCH is received on serving cell $j_i(g)$ and the C-DAI field in the corresponding DL grant indicates a value of $I_{C-DAI,g}$, then the HARQ-ACK feedback bit position for the PDSCH received on serving cell $j_i(g)$ within the codebook $CB_{(i,ym)}$ is based on Equation 9, below:

$$P_g = K_g \hat{\times} 2 \quad Q + I_{C-DAI,g} \qquad (9)$$

In one embodiment, where A≥2, the UE 102 may determine the bit ordering using Equation 9, wherein $P_g$ identifies a pointer in the HARQ-ACK codebook, each pointer points to the starting of A feedback bit positions. Thus, for A=2, the first pointer (e.g., g=1) points to the first two bits of the HARQ-ACK codebook, the second pointer (e.g., g=2) to the second two bits of the HARQ-ACK codebook, and so on.

In another embodiment, where A=2, then the HARQ-ACK feedback bit position $P_{g,1}$ for the first TB received on PDSCH of serving cell $j_i(g)$ within the codebook $CB_{(i,ym)}$ is based on Equation 10, below:

$$P_{g,1} = [K_g \hat{\times} 2 \quad Q + (I_{C-DAI,g} - 1)] \times 2 + 1 \qquad (10)$$

The HARQ-ACK feedback bit position $P_{g,2}$ for the second TB received on PDSCH of serving cell $j_i(g)$ within the codebook $CB_{(i,ym)}$ is based on Equation 11, below:

$$P_{g,2} = [K_g \hat{\times} 2 \quad Q + (I_{C-DAI,g} - 1)] \times 2 + 2 \qquad (11)$$

In certain embodiments, the UE 102 calculates the value of $K_g$ as the number of serving cell pairs (g', g'') with $I_{C-DAI,g''} \leq I_{C-DAI,g''}$. Here, g'<g''≤g and serving cell j(g') and j(g'') are two serving cells in the cell group on which a PDSCH is received in the subframe and there is no other serving cell j(g''') in the cell group, wherein g'<g'''<g'', such that a PDSCH is received on serving cell j(g''') in the subframe. Further, PDSCH is received on serving cell j(g) in the subframe, and the serving cell index for a serving cell in the cell group is denoted as j(g) with 1≤g≤|$CG_i$| and |$CG_i$| is the number of serving cells in the cell group $CG_i$.

In one embodiment, the UE 102 populates the codebook $CB_{(i,ym)}$ with HARQ-ACK feedback in response to determining the bit ordering. For example, the UE 102 may insert A HARQ-ACK feedback bits corresponding to the PDSCH received on serving cell j(g) in the (($K_g \hat{\times} 2$ $Q_{C-DAI}$+$I_{C-DAI,g}$−1)×A+1)-th to (($K_g \hat{\times} 2$ $Q_{C-DAI}$+$I_{C-DAI,g}$)×A)-th bit position, where A is the maximum number of transport blocks (TBs) transmittable on PDSCH in a serving cell of the cell group within the subframe. In another embodiment, the UE 102 inserts a negative acknowledgment in each HARQ-ACK feedback bit position of the set of HARQ-ACK feedback bit positions for which there is no corresponding received PDSCH. Where the codebook size $CBS_{(i,ym)}$ is fixed for a cell group $CG_i$ in all subframes $y_m$, then the UE 102 may fill any remaining codebook bit positions with NAK bits.

In further embodiments, if $CBS_{(i,ym)}$=0 for a certain $CG_i$ and subframe $y_m$ (i.e., no PDSCH is received on serving cells in $CG_i$ and in a subframe $y_m$), then no HARQ-ACK feedback may be provided for $CG_i$ and subframe $y_m$, i.e., $CB_{(i,ym)}$ is an empty set. In other embodiments, if there is no PDSCH received on serving cells in $CG_i$ and in a subframe $y_m$, then the UE shall generate $CBS_{(i,ym)}$ number of NAK bits. In some embodiments, the UE 102 then transmit the HARQ-ACK codebook (e.g., $CB_F$) to the network equipment 104.

In certain embodiments, after determining the HARQ-ACK codebook $CB_{(i,ym)}$ for all cell groups in all subframes ($y_1, y_2, \ldots, y_M$), the UE forms the final HARQ-ACK feedback codebook $CB_F$, e.g., by concatenating $CB_{(i,ym)}$, based on Equation 12, below:

$$CB_F = [CB_{(1,y1)}, CB_{(2,y1)}, \ldots, CB_{(1,yM)}, CB_{(2,yM)}] \qquad (12)$$

In certain embodiments, the UE 102 transmits a HARQ-ACK feedback including the final HARQ-ACK codebook on PUCCH. In such embodiments, the UE 102 may determine the PUCCH transmission power based on the HARQ-ACK codebook size. In other embodiments, the UE 102 may transmit a HARQ-ACK feedback including the final HARQ-ACK codebook on PUSCH. In such embodiments, the UE 102 may determine the number of resource elements on PUSCH used for HARQ-ACK transmission based on the HARQ-ACK codebook size.

It should be noted that if $2 \leq \hat{Q} < N$, the disclosed embodiment may fail to achieve common understanding about the HARQ-ACK codebook between the network equipment 104 and the UE 102, if the UE misses $2 \leq \hat{Q}$ consecutively scheduled serving cells in a cell group and in a subframe. However, the probability of missing $2 \leq \hat{Q}$ consecutively scheduled serving cells is low, due to the fairly reliable PDCCH detection performance in LTE (e.g., LTE requires no more than 1% PDCCH miss detection). Further, the channel and interference conditions on different serving cells are less correlated in LTE, which means the PDCCH detection error on different serving cells is not highly correlated.

While the above embodiments refer to HARQ-ACK feedback of TBs on PDSCH, in some embodiments TBs on PDCCH without associated PDSCH may also requires HARQ-ACK feedback. For example, the PDCCH indicating DL SPS (semi-persistent scheduling) release as specified in 3GPP LTE may require HARQ-ACK feedback. The same principles discussed above in the context of PDSCH HARQ-ACK feedback are also applicable for such PDCCH without associated PDSCH. Accordingly, for PDSCH scheduled without a corresponding PDCCH (i.e., the PDSCH semi-persistently scheduled), its corresponding HARQ-ACK can be appended to the HARQ-ACK codebook generated according to the above embodiments.

Figure 3:
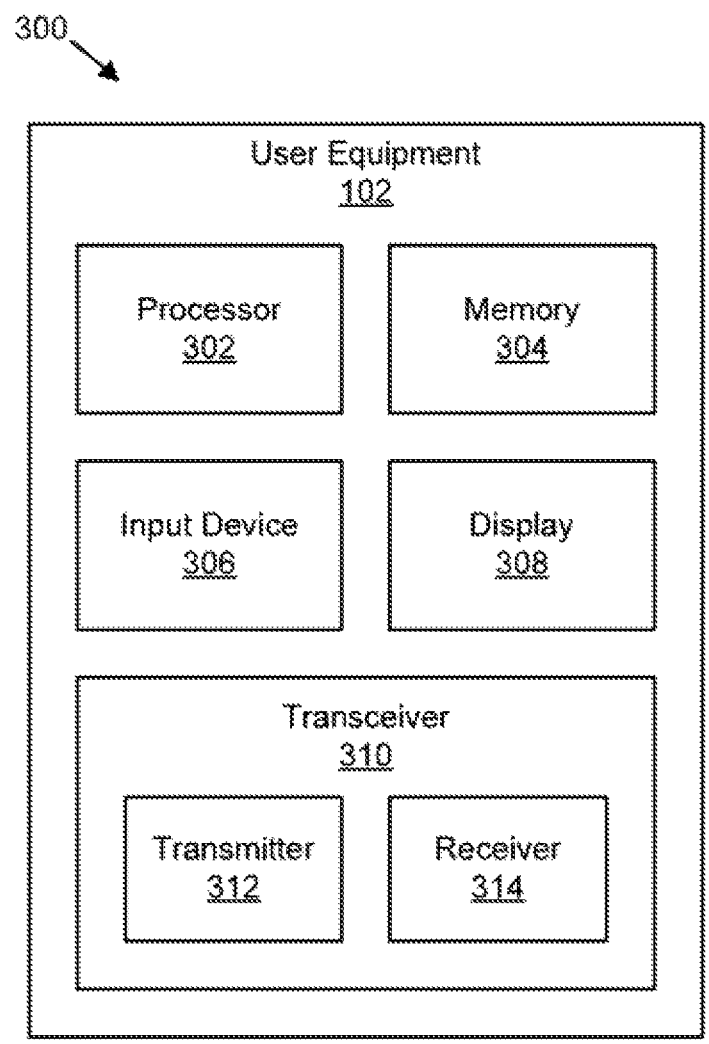
FIG. 3 is a schematic block diagram illustrating one embodiment of an apparatus that may be used for determining a HARQ-ACK codebook.

FIG. 3 depicts one embodiment of an apparatus 300 that may be used for determining a HARQ-ACK codebook. The apparatus 300 includes one embodiment of the UE 102. Furthermore, the UE 102 may include a processor 302, a memory 304, an input device 306, a display 308, and a transceiver 310. In some embodiments, the input device 306 and the display 308 are combined into a single device, such as a touchscreen.

The processor 302, in one embodiment, may include any known controller capable of executing computer-readable instructions and/or capable of performing logical operations. For example, the processor 302 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 302 executes instructions stored in the memory 304 to perform the methods and routines described herein. The processor 302 is communicatively coupled to the memory 304, the input device 306, the display 308, and the transceiver 310.

The memory 304, in one embodiment, is a computer readable storage medium. In some embodiments, the memory 304 includes volatile computer storage media. For example, the memory 304 may include a RAM, including dynamic RAM ("DRAM"), synchronous dynamic RAM ("SDRAM"), and/or static RAM ("SRAM"). In some embodiments, the memory 304 includes non-volatile computer storage media. For example, the memory 304 may include a hard disk drive, a flash memory, or any other suitable non-volatile computer storage device. In some embodiments, the memory 304 includes both volatile and non-volatile computer storage media. In some embodiments, the memory 304 stores data relating to determining a HARQ-ACK codebook. In some embodiments, the memory 304 also stores program code and related data, such as an operating system or other controller algorithms operating on the UE 102.

The input device 306, in one embodiment, may include any known computer input device including a touch panel, a button, a keyboard, a stylus, a microphone, or the like. In some embodiments, the input device 306 may be integrated with the display 308, for example, as a touchscreen or similar touch-sensitive display. In some embodiments, the input device 306 includes a touchscreen such that text may be input using a virtual keyboard displayed on the touchscreen and/or by handwriting on the touchscreen. In some embodiments, the input device 306 includes two or more different devices, such as a keyboard and a touch panel.

The display 308, in one embodiment, may include any known electronically controllable display or display device. The display 308 may be designed to output visual, audible, and/or haptic signals. In some embodiments, the display 308 includes an electronic display capable of outputting visual data to a user. For example, the display 308 may include, but is not limited to, an LCD display, an LED display, an OLED display, a projector, or similar display device capable of outputting images, text, or the like to a user. As another, non-limiting, example, the display 308 may include a wearable display such as a smart watch, smart glasses, a heads-up display, or the like. Further, the display 308 may be a component of a smart phone, a personal digital assistant, a television, a table computer, a notebook (laptop) computer, a personal computer, a vehicle dashboard, or the like.

In certain embodiments, the display 308 includes one or more speakers for producing sound. For example, the display 308 may produce an audible alert or notification (e.g., a beep or chime). In some embodiments, the display 308 includes one or more haptic devices for producing vibrations, motion, or other haptic feedback. In some embodiments, all or portions of the display 308 may be integrated with the input device 306. For example, the input device 306 and display 308 may form a touchscreen or similar touch-sensitive display. In other embodiments, the display 308 may be located near the input device 306.

The transceiver 310, in one embodiment, is configured to communicate wirelessly with the network equipment 104. In certain embodiments, the transceiver 310 comprises a transmitter 312 and a receiver 314. The transmitter 312 is used to transmit UL communication signals to the network equipment 104 and the receiver 314 is used to receive DL communication signals from the network equipment 104. For example, the receiver 314 may receive a PDSCH on one or more serving cells and the transmitter 312 may transmit a HARQ-ACK feedback message responsive to receiving the PDSCH. The HARQ-ACK feedback message may comprise a HARQ-ACK codebook, as described in further detail below. In another example, the receiver 314 may receive a DCI sent by the network equipment 104 and scheduling a PDSCH on one or more serving cells of a set of aggregated serving cells.

The transmitter 312 and the receiver 314 may be any suitable types of transmitters and receivers. Although only one transmitter 312 and one receiver 314 are illustrated, the transceiver 310 may have any suitable number of transmitters 310 and receivers 312. For example, in some embodiments, the UE 102 includes a plurality of transmitter 312 and receiver 314 pairs for communicating on a plurality of wireless networks and/or radio frequency bands, each transmitter 312 and receiver 314 pair configured to communicate on a different wireless network and/or radio frequency band than the other transmitter 312 and receiver 314 pairs.

Figure 4:
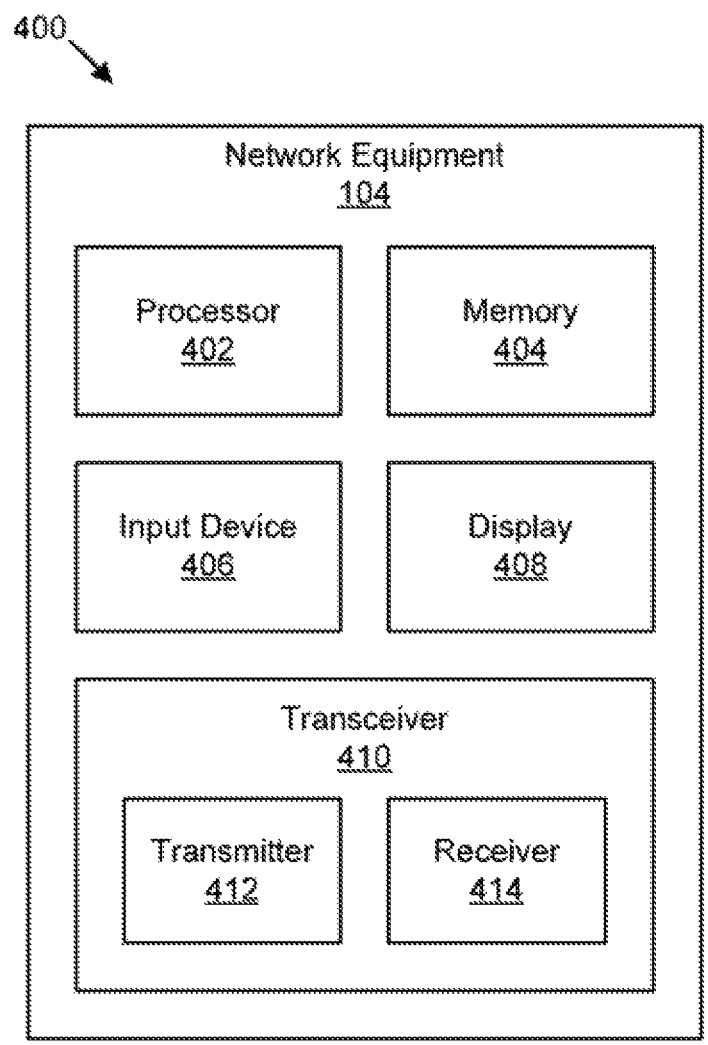
FIG. 4 is a schematic block diagram illustrating another embodiment of an apparatus that may be used for determining a HARQ-ACK codebook.

FIG. 4 depicts another embodiment of an apparatus 400 that may be used for determining a HARQ-ACK codebook. The apparatus 400 includes one embodiment of the network equipment 104. Furthermore, the network equipment 104 may include a processor 402, a memory 404, an input device 406, a display 408, and a transceiver 410. As may be appreciated, the processor 402, the memory 404, the input device 406, and the display 408 may be substantially similar to the processor 302, the memory 304, the input device 306, and the display 308 of the UE 102, respectively.

The transceiver 410, in one embodiment, is configured to communicate wirelessly with the network equipment 104. In certain embodiments, the transceiver 410 comprises a transmitter 412 and a receiver 414. The transmitter 412 is used to transmit DL communication signals to the UE 102 and the receiver 414 is used to receive UL communication signals from the UE 102. For example, the transmitter 412 may transmit a PDSCH on one or more serving cells and the receiver 414 may receive a responding HARQ-ACK feedback message from the UE 102. The HARQ-ACK feedback message may comprise a HARQ-ACK codebook, as described in further detail below. In another example, the transmitter 412 may transmit a DCI to the UE 102 and scheduling a PDSCH on one or more serving cells of a set of aggregated serving cells.

The transceiver 410 may communicate simultaneously with a plurality of UEs 102. For example, the transmitter 412 may transmit DL communication signals received by multiple UEs 102. As another example, the receiver 414 may simultaneously receive UL communication signals from multiple UEs 102. The transmitter 412 and the receiver 414 may be any suitable types of transmitters and receivers. Although only one transmitter 412 and one receiver 414 are illustrated, the transceiver 410 may have any suitable number of transmitters 410 and receivers 312. For example, the network equipment 104 may serve multiple cells and/or cell sectors, wherein the transceiver 410 includes a transmitter 412 and receiver 414 for each cell or cell sector.

Figure 5:
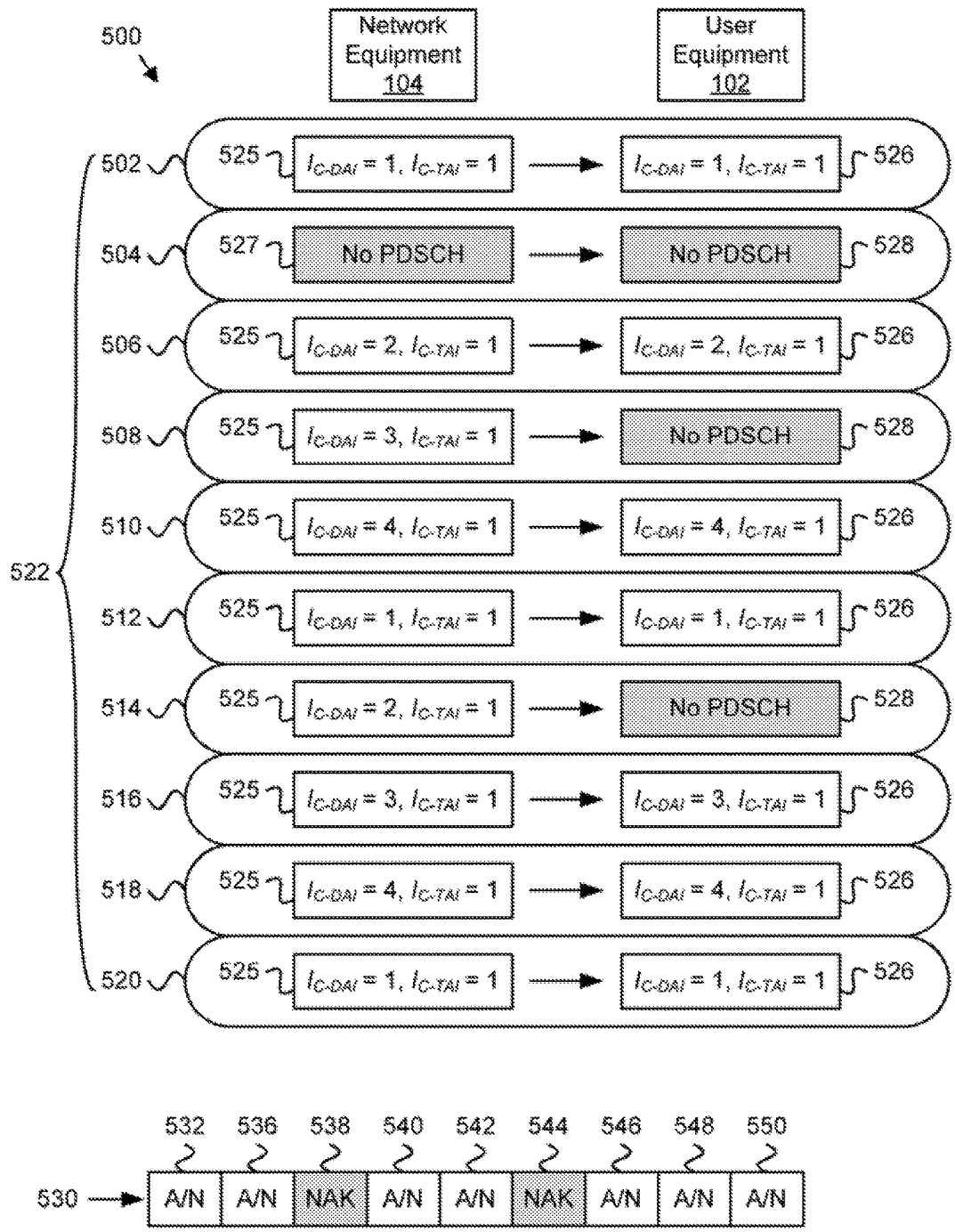
FIG. 5 illustrates one embodiment of a system determining a HARQ-ACK codebook for one cell group and over one subframe.

FIG. 5 depicts an exemplary system 500 having a user equipment (UE) 102 determining a HARQ-ACK codebook 530, according to embodiments of the present disclosure. The system 500 includes a network equipment 104 serving a user equipment 102 via a plurality of serving cells 502-520. The number of serving cells, denoted as N, aggregated by the UE 102 is 10 (e.g., N=10), and the number of subframes, denoted as M, for which a HARQ-ACK response is required is 1 (e.g., M=1). Assume that the number of bits for C-DAI and C-TAI is 2 (e.g., $Q_{C-DAI}=Q_{C-TAI}=Q=2$). Serving cells 502-520 are configured with transmission mode(s) that support the same maximum number of TBs transmittable on a PDSCH in a serving cell and in a subframe, denoted as A. In the depicted embodiment, it is assumed that at most one TB can be transmitted on a PDSCH in a serving cell and in a subframe, thus A=1. Accordingly, serving cells 502-520 are belong to a single cell group 522 (e.g., $CG_1$).

As depicted, the network equipment 104 schedules PDSCH on 9 out of the 10 configured serving cells. Specifically, PDSCH is scheduled 525 on serving cells 502 and 506-520, while serving cell 504 is not scheduled 527 with a PDSCH. Assume, the UE 102 misses the PDCCH scheduling PDSCH on serving cells 508 and 514. Thus, the UE 102 receives 526 PDSCH on serving cells 502, 506, 510, 512, 514, 516, 518, and 520. The UE 102 does not receive 528 PDSCH on serving cells 504, 508, and 514.

The UE 102 determines a HARQ-ACK codebook 530 by calculating first the codebook size, and second the codebook bit order. To determine the HARQ-ACK codebook size, the UE determines the total number of serving cells scheduled with PDSCH. Because the UE 102 missed the PDCCH for serving cells 508 and 514, it does not know the total number of serving cells scheduled with PDSCH. Thus, the UE 102 cannot rely on the received PDCCH and/or on the received number of PDSCH to determine the total number of serving cells scheduled with PDSCH. Instead, the UE 102 calculates the total number of serving cells scheduled the PDSCH based on the C-DAI and C-TAI.

Using one of the algorithms described above with reference to FIGS. 1 and 2B, the UE 102 determines K=2. FIG. 5 visually depicts this, as $I_{C-DAI}$ rolls back to "1" at serving cell 512 and again at serving cell 520. Thus, K=2. Having calculated K, the UE 102 determines the codebook size, CBS, for the HARQ-ACK codebook 530 using equation 5, above. Thus, CBS=[2×$\hat{2}$ (2)+1]×1=[2×4+1]×1=9.

Next, the UE 102 determines the codebook bit ordering, using Equation 9, above. Assume the HARQ-ACK feedback bit for PDSCH on serving cell g is denoted as HARQ-ACK (g). For serving cell 502, $I_{C-DAI,g}=1$, $K_g=0$. Hence the HARQ-ACK(502) occupies the first bit position 532 within the codebook 530, as $K_g \times 2$ $Q+I_{C-DAI,g}=1$. For serving cell 506, $I_{C-DAI,g}=2$, $K_g=0$. Hence the HARQ-ACK(506) occupies the second bit position 536 within the codebook 530, as $K_g \times 2$ $Q+I_{C-DAI,g}=2$. For serving cell 510, $I_{C-DAI,g}=4$, $K_g=0$. Hence the HARQ-ACK(510) occupies the fourth bit position 540 within the codebook 530, as $K_g \times 2$ $Q+I_{C-DAI,g}=4$.

Continuing, for serving cell 512, $I_{C-DAI,g}=1$, $K_g=1$. Hence the HARQ-ACK(512) occupies the fifth bit position 542 within the codebook 530, as $K_g \times 2$ $Q+I_{C-DAI,g}=5$. For serving cell with index 516, $I_{C-DAI,g}=3$, $K_g=1$. Hence the HARQ-ACK(516) occupies the seventh bit position 546 within the codebook 530, as $K_g \times 2$ $Q+I_{C-DAI,g}=7$. For serving cell 518, $I_{C-DAI,g}=4$, $K_g=1$. Hence the HARQ-ACK(518) occupies the eighth bit position 548 within the codebook 530, as $K_g \times 2$ $Q+I_{C-DAI,g}=8$. Finally, for serving cell 520, $I_{C-DAI,g}=1$. $K_g=2$. Hence the HARQ-ACK(520) occupies the ninth bit position 550 within the codebook 530, as $K_g \times 2$ $Q+I_{C-DAI,g}=9$.

After processing over all serving cells with PDSCH received, the UE 102 calculates the HARQ-ACK codebook 530, CB, as follows: CB=[HARQ-ACK(502), HARQ-ACK(506), [unknown], HARQ-ACK(510), HARQ-ACK(512). [unknown]. HARQ-ACK(516), HARQ-ACK(518), HARQ-ACK(520)]. In FIG. 5, the HARQ-ACK feedback bit for a received PDSCH on serving cell g is denoted as "A/N."

The HARQ-ACK feedback values for the third bit position 538 and sixth bit position 544 in the HARQ-ACK codebook 530 are not available yet, due to the missed PDCCH. Accordingly, the UE 102 sets NAK to the third bit position 538 and the sixth bit position 542 within the codebook 530 if there is no corresponding PDSCH received. Thus, the UE 102 calculates the HARQ-ACK codebook 530, as follows: CB=[HARQ-ACK(502), HARQ-ACK(506), NAK, HARQ-ACK(510), HARQ-ACK(512), NAK, HARQ-ACK(516), HARQ-ACK(518), HARQ-ACK(520)]. Having calculated the HARQ-ACK codebook, the UE 102 transmits a HARQ-ACK feedback response (including the HARQ-ACK codebook 530) to the network equipment 104.

Meanwhile, the network equipment 104 determines the HARQ-ACK codebook 530 following similar procedure. In one embodiment, the network equipment 104 does not need to derive the HARQ-ACK codebook 530 using C-DAI and C-TAI, as the network equipment 104 is already aware of the accumulated number of serving cells scheduled with PDSCH and the total number of serving cells scheduled with PDSCH. Rather, the network equipment 104 may determine the codebook size, CBS, using Equation 8, above. Thus, CBS=I×A=9×1=9. As described, the UE 102 and the network equipment 104 determine the same codebook size, CBS, despite using different equations and/or algorithms.

The network equipment 104 then determines the codebook bit ordering. In one embodiment, the network equipment 104 does not derive the bit ordering using C-DAI, as the network equipment is already aware of the accumulated number of serving cells scheduled with PDSCH. Rather, the network equipment 104 may determine the codebook a bit ordering based on the serving cell indices of the scheduled serving cells and based on A, the maximum number of TBs transmittable on PDSCH in a serving cell (recall that A=1). Thus, the network equipment 104 calculates the codebook 530 as follows: CB=[HARQ-ACK(502), HARQ-ACK(506), HARQ-ACK(508), HARQ-ACK(510), HARQ-ACK(512), HARQ-ACK(514), HARQ-ACK(516), HARQ-ACK(518), HARQ-ACK(520)]. Again, the UE 102 and the network equipment 104 determine the same HARQ-ACK codebook 530 despite using different equations and/or algorithms.

Upon receipt of the HARQ-ACK codebook 530 from the UE 102, the network equipment 104 schedules for retransmission the PDSCH sent on serving cell 508 and the PDSCH sent on serving cell 514 (e.g., due to the UE 102 misses).

Figure 6:
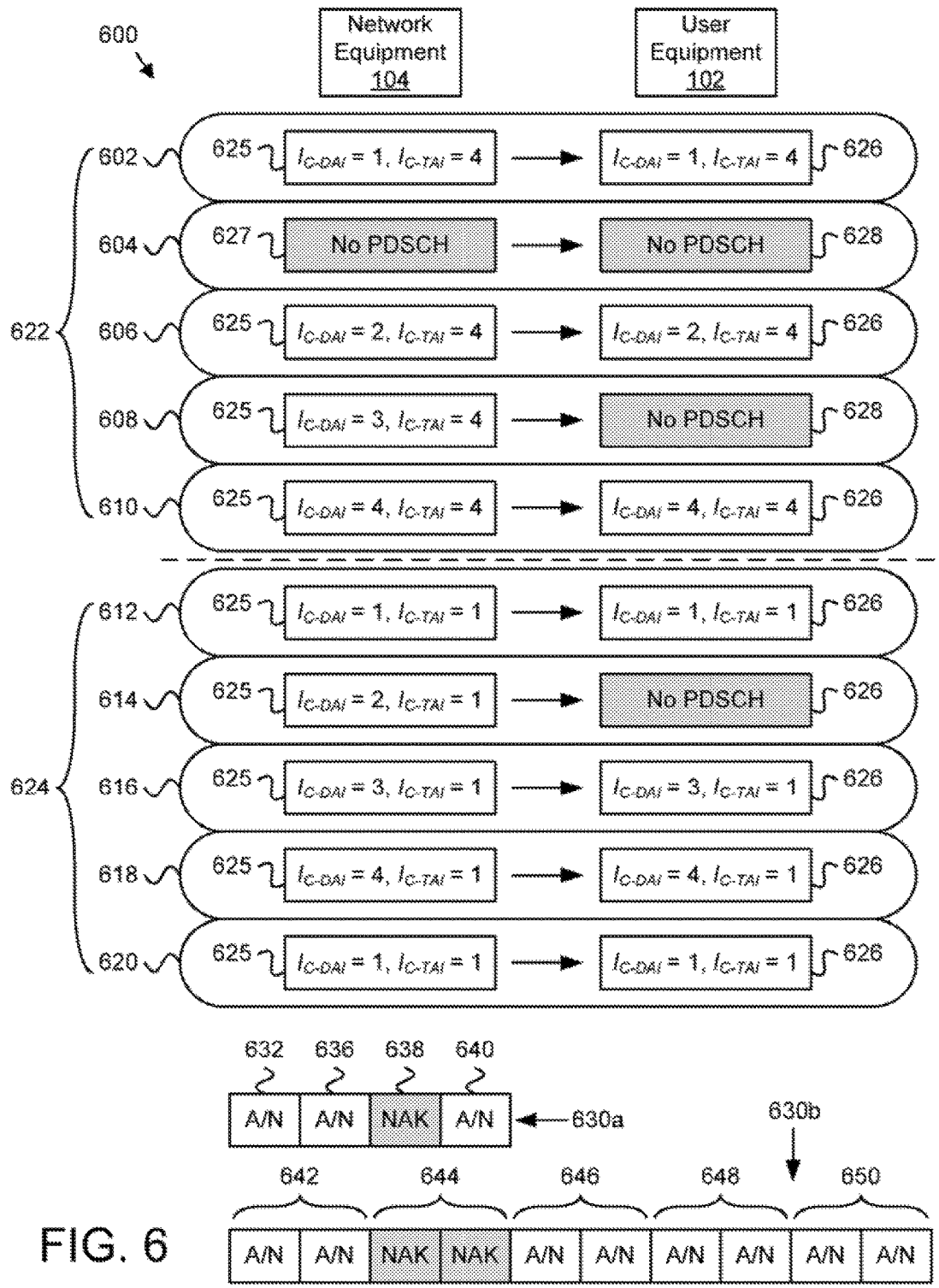
FIG. 6 illustrates one embodiment of a system determining a HARQ-ACK codebook for two cell groups and over one subframe.

FIG. 6 depicts an exemplary system 600 having a user equipment (UE) 102 determining a HARQ-ACK codebook 630, according to embodiments of the present disclosure. The system 600 includes a network equipment 104 serving a user equipment 102 via a plurality of serving cells 602-620. The number of serving cells, denoted as N, aggregated by the UE 102 is 10 (e.g., N=10), and the number of subframes, denoted as M, for which a HARQ-ACK response is required is 1 (e.g., M=1). Assume that the number of bits for C-DAI and C-TAI is 2 (e.g., $Q_{C-DAI}=Q_{C-TAI}=Q=2$). In the depicted embodiment, it is assumed that at most one TB can be transmitted on a PDSCH in serving cells 602-610 and in a subframe, and that at most two TBs can be transmitted on a PDSCH in serving cells 612-620. Serving cells 602-610 belong to a first cell group 622 (e.g., $CG_1$) while serving cells 612-620 belong to a second cell group 624 (e.g., $CG_2$). Thus, $A_{CG1}=1$ for the first cell group 622, while $A_{CG2}=2$ for the second cell group 624.

As depicted, the network equipment 104 schedules PDSCH on 9 out of the 10 configured serving cells. Specifically, PDSCH is scheduled 625 on serving cells 602 and 606-620, while serving cell 604 is not scheduled 627 with a PDSCH. Assume, the UE 102 misses the PDCCH scheduling PDSCH on serving cells 608 and 614. Thus, the UE 102 receives 626 PDSCH on serving cells 602, 606, 610, 612, 614, 616, 618, and 620. The UE 102 does not receive 628 PDSCH on serving cells 604, 608, and 614.

The UE 102 determines a first HARQ-ACK codebook 630a for the first cell group 622 and a second HARQ-ACK codebook 630b for the second cell group 624. The UE 102 determines the HARQ-ACK codebooks 630a-b by calculating the codebook size and the codebook bit ordering for each of HARQ-ACK codebooks 630a-b.

To determine the size of the HARQ-ACK codebooks 630a-b, the UE determines the total number of serving cells scheduled with PDSCH within a cell group. Because the UE 102 missed the PDCCH for serving cells 608 and 614, it does not know, a priori, the total number of serving cells scheduled with PDSCH. Thus, the UE 102 cannot rely on the received PDCCH and/or on the received number of PDSCH to determine the total number of serving cells scheduled with PDSCH. Instead, the UE 102 calculates the total number of serving cells scheduled the PDSCH based on the C-DAI and C-TAI.

Using the algorithm described above with reference to FIG. 2B, the UE 102 determines $K_i$. Here, $K_1=0$ for the first cell group 622 and $K_2=1$ for the second cell group 624. FIG. 6 visually depicts this, as $I_{C-DAI}$ rolls back to "1" at serving cell 618 (second cell group 624). Thus, $K_1=0$ and $K_2=1$. Having calculated $K_i$, the UE 102 determines the codebook size, $CBS_{(i,ym)}$, using Equation 5, above. Thus, $CBS_1=[0\hat{\times}2 \ (2)+4]\times 1=[0+4]\times 1=4$ and $CBS_2=[1\hat{\times}2 \ (2)+1]\times 2=[4+1]\times 2=10$.

Next, the UE 102 determines the codebook bit ordering for the first HARQ-ACK codebook 630a using Equation 9, above. The HARQ-ACK feedback bit for PDSCH on serving cell g is denoted as HARQ-ACK(g). For serving cell 602, $I_{C-DAI,g}=1$, $K_g=0$. Hence the HARQ-ACK(602) occupies the first bit position 632 within the codebook 630a, as $K_g\hat{\times}2 \ Q+I_{C-DAI,g}=1$. For serving cell 606, $I_{C-DAI,g}=2$, $K_g=0$. Hence the HARQ-ACK(606) occupies second bit position 636 within the codebook 630a, as the $K_g\hat{\times}2 \ Q+I_{C-DAI,g}=2$. For serving cell 610, $I_{C-DAI,g}=4$, $K_g=0$. Hence the HARQ-ACK(610) occupies the fourth bit position 638 within the codebook 630a, as $K_g\hat{\times}2 \ Q+I_{C-DAI,g}=4$.

In one embodiment, UE 102 also determines the codebook bit ordering for the second HARQ-ACK codebook 630b using Equation 9, above. The HARQ-ACK feedback bit for serving cell j is denoted as HARQ-ACK(j), and is a 2-bit value: a first feedback bit for the first TB transmitted on the PDSCH and a second feedback bit for the second TB transmitted on PDSCH. For serving cell 612, $I_{C-DAI,g}=1$, $K_g=0$. Hence the HARQ-ACK(612) occupies a first pointer 642 within the codebook 630b, as $K_g\hat{\times}2 \ Q+I_{C-DAI,g}=1$. For serving cell with index 616, $I_{C-DAI,g}=3$. $K_g=0$. Hence the HARQ-ACK(616) occupies a third pointer 646 within the codebook 630b, as $K_g\hat{\times}2 \ Q+I_{C-DAI,g}=3$. For serving cell 618, $I_{C-DAI,g}=4$, $K_g=0$. Hence the HARQ-ACK(618) occupies a fourth pointer 648 within the codebook 630b, as $K_g\hat{\times}2 \ Q+I_{C-DAI,g}=4$. Finally, for serving cell 620, $I_{C-DAI,g}=1$, $K_g=2$. Hence the HARQ-ACK(620) occupies a fifth bit position 650 within the codebook, as $K_g\hat{\times}2 \ Q+I_{C-DAI,g}=5$. Alternatively, the UE 102 may use Equations 10 and 11, above, to identify the bit positions for each of the two feedback bits.

After processing over all serving cells with PDSCH received, the UE 102 calculates the first HARQ-ACK codebook 630a, $CB_1$, as follows: $CB_1$=[HARQ-ACK(602), HARQ-ACK(606), [unknown], HARQ-ACK(610)]. The UE 102 calculates the second HARQ-ACK codebook 630b, $CB_2$, as follows: $CB_2$=[HARQ-ACK(612), [unknown], HARQ-ACK(616), HARQ-ACK(618), HARQ-ACK(620)]. Recall that in the second HARQ-ACK codebook 630b, each HARQ-ACK feedback comprise two bits, thus resulting in a 10-bit codebook. In FIG. 6, the HARQ-ACK feedback for a received PDSCH on serving cell g is denoted as "A/N."

The HARQ-ACK feedback values for the third bit position and second pointer in the HARQ-ACK codebooks 630a, 630b are not available due to the missed PDSCH. Accordingly, the UE 102 sets NAK to any HARQ-ACK feedback bit position within the HARQ-ACK codebooks 630a, 630b if there is no corresponding PDSCH received. Thus, the UE 102 calculates the first HARQ-ACK codebook 630a as follows: $CB_1$=[HARQ-ACK(602), HARQ-ACK(606), NAK, HARQ-ACK(610)]. The UE 102 calculates the second HARQ-ACK codebook 630b, $CB_2$, as follows: $CB_2$= [HARQ-ACK(612), NAK, HARQ-ACK(616), HARQ-ACK(618), HARQ-ACK(620)]. In one embodiment, the UE 102 concatenates the HARQ-ACK codebooks 630a, 630b into a final HARQ-ACK codebook and transmits a HARQ-ACK feedback response (including the final HARQ-ACK codebook) to the network equipment 104.

Meanwhile, the network equipment 104 determines the HARQ-ACK codebooks 630a and 630b following similar procedure. In one embodiment, the network equipment 104 does not need to derive the HARQ-ACK codebooks 630a-b using C-DAI and C-TAI, as the network equipment 104 is already aware of the accumulated number of serving cells scheduled with PDSCH and the total number of serving cells scheduled with PDSCH. Rather, the network equipment 104 may determine the codebook sizes, $CBS_1$ and $CBS_2$, using Equation 8, above. Thus, for the first HARQ-ACK codebook 630a, $CBS_1 = I_1 \times A = 4 \times 1 = 4$. For the second HARQ-ACK codebook 630b, $CBS_2 = I_2 \times A = 5 \times 2 = 10$. As described, the UE 102 and the network equipment 104 determine the same codebook sizes, $CBS_1$ and $CBS_2$, despite using different equations and/or algorithms.

The network equipment 104 then determines the codebook bit ordering for the HARQ-ACK codebooks 630a, 630b. In one embodiment, the network equipment 104 does not derive the bit ordering using C-DAI, as the network equipment is already aware of the accumulated number of serving cells scheduled with PDSCH. Rather, the network equipment 104 may determine the codebook a bit ordering based on the serving cell indices of the scheduled serving cells and based on A, the maximum number of TBs transmittable on PDSCH in a serving cell (recall that $A_{CG1}=1$ and $A_{CG2}=2$). Thus, the network equipment 104 calculates the first HARQ-ACK codebook 630a as follows: $CB_1$=[HARQ-ACK(602), HARQ-ACK(606), HARQ-ACK(608), HARQ-ACK(610)]. Thus, the network equipment 104 calculates the second HARQ-ACK codebook 630b as follows: $CB_2$= [HARQ-ACK(612), HARQ-ACK(614), HARQ-ACK(616), HARQ-ACK(618), HARQ-ACK(620)]. Again, the UE 102 and the network equipment 104 determine the same HARQ-ACK codebooks 630a, 630b despite using different equations and/or algorithms.

Upon receipt of the HARQ-ACK codebooks 630a, 630b from the UE 102, the network equipment 104 schedules for retransmission the PDSCH sent on serving cell 608 and the PDSCH sent on serving cell 614 (e.g., due to the UE 102 misses).

FIG. 7 depicts an exemplary diagram 700 for a UE, such as UE 102, determining a HARQ-ACK codebook 730, according to embodiments of the present disclosure. The diagram 700 shows PDSCH reception over plurality of serving cells 702-720 and a plurality of subframes 721 and 723. The number of serving cells, denoted as N, aggregated by the UE 102 is 10 (e.g., N=10), and the number of subframes, denoted as M, for which a HARQ-ACK response is required is 2 (e.g., M=2).

Assume that the number of bits for C-DAI and C-TAI is 2 (e.g., $Q_{C-DAI}=Q_{C-TAI}=Q=2$). In the depicted embodiment, it is assumed that at most one TB can be transmitted on a PDSCH in serving cells 702-710 and in a subframe, and that at most two TBs can be transmitted on a PDSCH in serving cells 712-720. Serving cells 702-710 belong to a first cell group 722 (e.g., $CG_1$) while serving cells 712-720 belong to a second cell group 724 (e.g., $CG_2$). Thus, $A_{CG1}=1$ for the first cell group 722, while $A_{CG2}=2$ for the second cell group 724.

As depicted. PDSCH is received 726 during the first subframe 721 on serving cells 702 and 706-712, and 716-720. PDSCH is also received 726 during the second subframe 723 on serving cells 704 and 710-720. The UE fails to receive 728 PDSCH on serving cells 704 and 714 during the first subframe 721, and fails to receive 728 PDSCH on serving cells 702, 706, and 708 during the second subframe 723.

The UE determines a four HARQ-ACK codebooks 730a-730d. A first HARQ-ACK codebook 730a is determined for the combination of the first cell group 722 and the first subframe 721. A second HARQ-ACK codebook 730b is determined for the combination of the second cell group 724 and the first subframe 721. A third HARQ-ACK codebook 730c is determined for the combination of the first cell group 722 and the second subframe 723. A fourth HARQ-ACK codebook 730d is determined for the combination of the second cell group 724 and the second subframe 723. The UE 102 determines the HARQ-ACK codebooks 730a-d by calculating the codebook size and the codebook bit ordering for each of HARQ-ACK codebooks 730a-d.

To determine the size of the HARQ-ACK codebooks 730a-d, the UE determines the total number of serving cells scheduled with PDSCH within a cell group based on the C-DAI and C-TAI. Using one of the algorithms described above with reference to FIGS. 1 and 2B, the UE determines $K_{i,m}$. Here, $K_{1,1}=1$ for the first cell group 722 during the first subframe 721, and $K_{2,1}=0$ for the second cell group 724 during the first subframe 721. The UE further determines $K_{1,2}=0$ for the first cell group 722 during the second subframe 723, and $K_{2,2}=1$ for the second cell group 724 during the second subframe 723. FIG. 7 visually depicts this, as $I_{C-DAI}$ rolls back to "1" at serving cell 710 (first cell group 722) during the first subframe 721 and again at serving cell 720 (second cell group 724) during the second subframe 723. Having calculated $K_{i,m}$, the UE determines the codebook size, $CBS_{(i,ym)}$, using Equation 5, above. Thus, $CBS_{1,1}=[1 \times 2 \ (2)+1] \times 1 = [4+1] \times 1 = 5$, $CBS_{2,1}=[0 \times 2 \ (2)+4] \times 2 = [0+4] \times 2 = 8$, $CBS_{1,2}=[0 \times 2 \ (2)+3] \times 1 = [0+3] \times = 3$ and $CBS_{2,2}=[1 \times 2 \ (2)+1] \times 2 = [4+1] \times 2 = 10$.

Next, the UE determines the codebook bit ordering for the first and third HARQ-ACK codebook 730a and 730c using Equation 9, above. The UE does this for both the first subframe 721 and the second subframe 723. The HARQ-ACK feedback bit for PDSCH on serving cell g during subframe m is denoted as HARQ-ACK(g,m), where m=1 for the first subframe 721 and m=2 for the second subframe 723.

In the first cell group 722 and during the first subframe 721, the HARQ-ACK bit ordering is as follows. For serving cell 702, $I_{C-DAI,g}=1$, $K_g=0$. Hence the HARQ-ACK(702,1) occupies the first bit position 732 within the codebook 730a, as $K_g \hat{x} 2 \ Q+I_{C-DAI,g}=1$. For serving cell 706, $I_{C-DAI,g}=3$, $K_g=0$. Hence the HARQ-ACK(706,1) occupies third bit position 736 within the codebook 730a, as the $K_g \hat{x} 2 \ Q+I_{C-DAI,g}=3$. For serving cell 708, $I_{C-DAI,g}=4$, $K_g=0$. Hence the HARQ-ACK(708,1) occupies the fourth bit position 738 within the codebook 730a, as $K_g \times 2 \ Q+I_{C-DAI,g}=4$. For serving cell 710, $I_{C-DAI,g}=1$, $K_g=1$. Hence the HARQ-ACK (710,1) occupies the fifth bit position 740 within the codebook 730a, as $K_g \hat{x} 2 \ Q+I_{C-DAI,g}=5$.

In the first cell group 722 and during the second subframe 723, the HARQ_ACK bit ordering is as follows. For serving cell 704, $I_{C-DAI,g}=1$. $K_g=0$. Hence the HARQ-ACK(702,2) occupies the first bit position 754 within the codebook 730c as $K_g \hat{x} 2 \ Q+I_{C-DAI,g}1$. For serving cell 710, $I_{C-DAI,g}=3$, $K_g=0$. Hence the HARQ-ACK(710,2) occupies the third bit position 760 within the third codebook 730c, as $K_g \hat{x} 2 \ Q+I_{C-DAI,g}=3$.

In one embodiment, UE 102 also determines the codebook bit ordering for the second and fourth HARQ-ACK codebooks 730b, 730d using Equation 9, above. The HARQ-ACK feedback bit for serving cell g is denoted as HARQ-ACK(g,m), and for the second HARQ-ACK codebook 730b it is a 2-bit value: a first feedback bit for the first TB transmitted on the PDSCH and a second feedback bit for the second TB transmitted on PDSCH. Alternatively, the UE 102 may use Equations 10 and 11, above, to identify the bit positions for each of the two feedback bits for the HARQ-ACK codebook 730*b*, 730*d*.

In the second cell group 724 and during the first subframe 721, the HARQ-ACK bit ordering is as follows. For serving cell 712, $I_{C\text{-}DAI,g}=1$, $K_g=0$. Hence the HARQ-ACK(712,1) occupies a first pointer 742 within the codebook 730*b*, as $K_g \times 2 \quad Q+I_{C\text{-}DAI,g}=1$. For serving cell with index 716, $I_{C\text{-}DAI,g}=2$, $K_g=0$. Hence the HARQ-ACK(716,1) occupies a second pointer 746 within the codebook 730*b*, as $K_g \times 2 \quad Q+I_{C\text{-}DAI,g}=2$. For serving cell 718, $I_{C\text{-}DAI,g}=3$, $K_g=0$. Hence the HARQ-ACK(718,1) occupies a third pointer 748 within the codebook 730*b*, as $K_g \times 2 \quad Q+I_{C\text{-}DAI,g}=3$. Finally, for serving cell 720, $I_{C\text{-}DAI,g}=4$, $K_g=0$. Hence the HARQ-ACK(720,1) occupies a fourth pointer 750 within the codebook 730*b*, as $K_g \times 2 \quad Q+I_{C\text{-}DAI,g}=4$.

In the second cell group 724 and during the second subframe 723, the HARQ-ACK bit ordering is as follows. For serving cell 712, $I_{C\text{-}DAI,g}=1$, $K_g=0$. Hence the HARQ-ACK(712,2) occupies a first pointer 762 within the codebook 730*d*, as $K_g \times 2 \quad Q+I_{C\text{-}DAI,g}=1$. For serving cell with index 714, $I_{C\text{-}DAI,g}=2$, $K_g=0$. Hence the HARQ-ACK(714,2) occupies a second pointer 764 within the codebook 730*d*, as $K_g \times 2 \quad Q+I_{C\text{-}DAI,g}=2$. For serving cell with index 716, $I_{C\text{-}DAI,g}=3$. $K_g=0$. Hence the HARQ-ACK(716,2) occupies a third pointer 766 within the codebook 730*d*, as $K_g \times 2 \quad Q+I_{C\text{-}DAI,g}=3$. For serving cell 718, $I_{C\text{-}DAI,g}=4$, $K_g=0$. Hence the HARQ-ACK(718,2) occupies a fourth pointer 748 within the codebook 730*d*, as $K_g \times 2 \quad Q+I_{C\text{-}DAI,g}=4$. Finally, for serving cell 720, $I_{C\text{-}DAI,g}=1$, $K_g=1$. Hence the HARQ-ACK(720,2) occupies a fifth pointer 770 within the codebook 730*d*, as $K_g \times 2 \quad Q+I_{C\text{-}DAI,g}=5$.

After processing over all serving cells with PDSCH received, the UE 102 calculates the first HARQ-ACK codebook 730*a*, $CB_{1,1}$, as follows: $CB_{1,1}$=[HARQ-ACK(702,1), NAK, HARQ-ACK(706,1), HARQ-ACK(708,1), HARQ-ACK(710,1)]. The UE 102 calculates the second HARQ-ACK codebook 730*b*, $CB_{2,1}$, as follows: $CB_{2,1}$=[HARQ-ACK(712,1), HARQ-ACK(716,1), HARQ-ACK(718,1), HARQ-ACK(720,1)]. Recall that in the second HARQ-ACK codebook 730*b*, each HARK-ACK feedback comprise two bits, thus resulting in an 8-bit codebook. In FIG. 7, the HARQ-ACK feedback bit for a received PDSCH on serving cell g is denoted as "A/N."

The UE 102 calculates the third HARQ-ACK codebook 730*c*, $CB_{1,2}$, as follows: $CB_{1,2}$=[HARQ-ACK(704,2), NAK, HARQ-ACK(710,2)]. The UE 102 calculates the fourth HARQ-ACK codebook 730*d*, $CB_2$, as follows: $CB_{2,1}$= [HARQ-ACK(712,2), HARQ-ACK(714,2), HARQ-ACK(716,2), HARQ-ACK(718,2), HARQ-ACK(720,2)]. Recall that in the fourth HARQ-ACK codebook 730*d*, each HARK-ACK feedback comprise two bits, thus resulting in a 10-bit codebook.

In one embodiment, the UE 102 concatenates the HARQ-ACK codebooks 730*a-d* into a final HARQ-ACK codebook and transmits a HARQ-ACK feedback response (including the final HARQ-ACK codebook) to the network equipment 104. As an example, the final HARQ-ACK codebook, $CB_F$, may be concatenated as follows: $CB_F$=[$CB_{1,1}$, $CB_{2,1}$, $CB_{1,2}$, $CB_{2,2}$].

Figure 8:
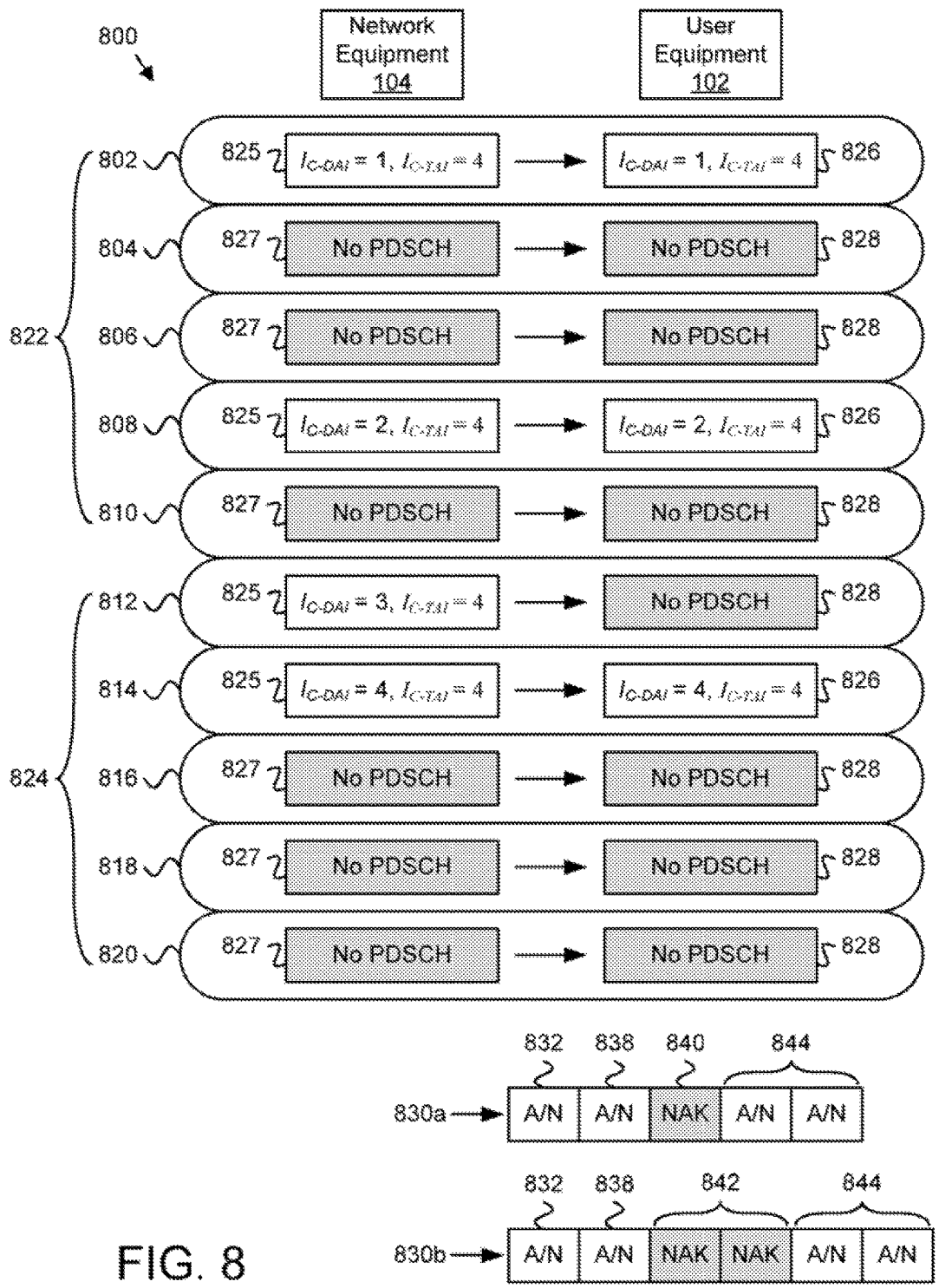
FIG. 8 illustrates one embodiment of a system determining a HARQ-ACK codebook without cell groups.

FIG. 8 depicts an exemplary system 800 for determining a HARQ-ACK codebook, according to embodiments of the disclosure. The system 800 includes a network equipment 104 serving a user equipment 102 via a plurality of serving cells 802-820. FIG. 8 shows the necessity of cell grouping according to the maximum number of TBs in a PDSCH.

Here, the number of serving cells, denoted as N, aggregated by the UE 102 is 10 (e.g., N=10), and the number of subframes, denoted as M, for which a HARQ-ACK response is required is 1 (e.g., M=1). Assume that the number of bits for C-DAI and C-TAI is 2 (e.g., $Q_{C\text{-}DAI}=Q_{C\text{-}TAI}=Q=2$). In the depicted embodiment, it is assumed that at most one TB can be transmitted on a PDSCH in serving cells 802-810 and in a subframe, and that at most two TBs can be transmitted on a PDSCH in serving cells 812-820. Serving cells 802-810 belong to a first cell group 822 (e.g., $CG_1$) while serving cells 812-8620 belong to a second cell group 824 (e.g., $CG_2$). Thus, $A_{CG1}=1$ for the first cell group 822, while $A_{CG2}=2$ for the second cell group 824.

As depicted, the network equipment 104 schedules PDSCH on 4 out of the 10 configured serving cells. Specifically, PDSCH is scheduled 825 on serving cells 802, 808, 812, and 814, while serving cells 804, 806, 810, 816, 818, and 820 are not scheduled 827 with a PDSCH. Assume, the UE 102 misses the PDCCH scheduling PDSCH on serving cell 812. Thus, the UE 102 receives 826 PDSCH on serving cells 802, 808, and 814. The UE 102 does not receive 828 PDSCH on serving cells 804, 806, 810, 812, 816, 818, and 820. From the $I_{C\text{-}DAI}$ value for serving cells 808 and 814 (i.e., 2 and 4 respectively), the UE 102 knows that it misses one DL grant, which may schedule PDSCH either on serving cell 810 or 812.

However, the UE 102 cannot determine a number of HARQ-ACK feedback bits expected for the missed DL grant, as only one TB is transmittable on serving cell 810, while two TB are transmittable on serving cell 812. However, the eNB cannot derive for which serving cell the PDSCH is missed. Furthermore, the network equipment 104 cannot determine that the UE 102 missed the PDSCH on serving cell 812 without the HARQ-ACK feedback. Thus, it is not possible to ensure the same understanding between eNB and UE on the HARQ-ACK codebook as the number of HARQ-ACK bit for serving cell 810 and serving cell 812 are different.

Instead, there are two possible HARQ-ACK codebooks that the UE 102 can derive: a first HARQ-ACK codebook 830*a* and a second HARQ-ACK codebook 830*b*. The first 10o HARQ-ACK codebook 830*a* comprises five bits, while the second HARQ-ACK codebook 830*b* comprises six bits. The first HARQ-ACK codebook 830*a* includes a first position 832 for the HARQ-ACK feedback of the serving cell 802, a second bit position 838 for the HARQ-ACK feedback of the serving cell 808, a third bit position 840 for the HARQ-ACK feedback of the serving cell 810 (recall that one feedback bit is expected for serving cell 810), and a fourth pointer 844 (e.g., pointing to A HARQ-ACK feedback bits, where A=2) for the HARQ-ACK feedback of serving cell 814. In FIG. 8, the HARQ-ACK feedback bit for a received PDSCH on serving cell g is denoted as "A/N."

In contrast, the first HARQ-ACK codebook 830*b* includes a first position 832 for the HARQ-ACK feedback of the serving cell 802, a second bit position 838 for the HARQ-ACK feedback of the serving cell 808, a third pointer (e.g., pointing to A HARQ-ACK feedback bits, where A=2) 842 for the HARQ-ACK feedback of the serving cell 812 (recall that two feedback bits are expected for serving cell 812), and a fourth pointer 844 for the HARQ-ACK feedback of serving cell 814. The network equipment 104 expects the second HARQ-ACK codebook 830*b*, as the network equipment 104 knows that it scheduled PDSCH on serving cell 812. However, it is possible that the UE 102 sends the first HARQ-ACK codebook 830*a* instead, resulting in HARQ- ACK feedback misalignment. Thus, cell grouping according to the maximum number of TBs in a PDSCH is necessary.

Figure 9A:
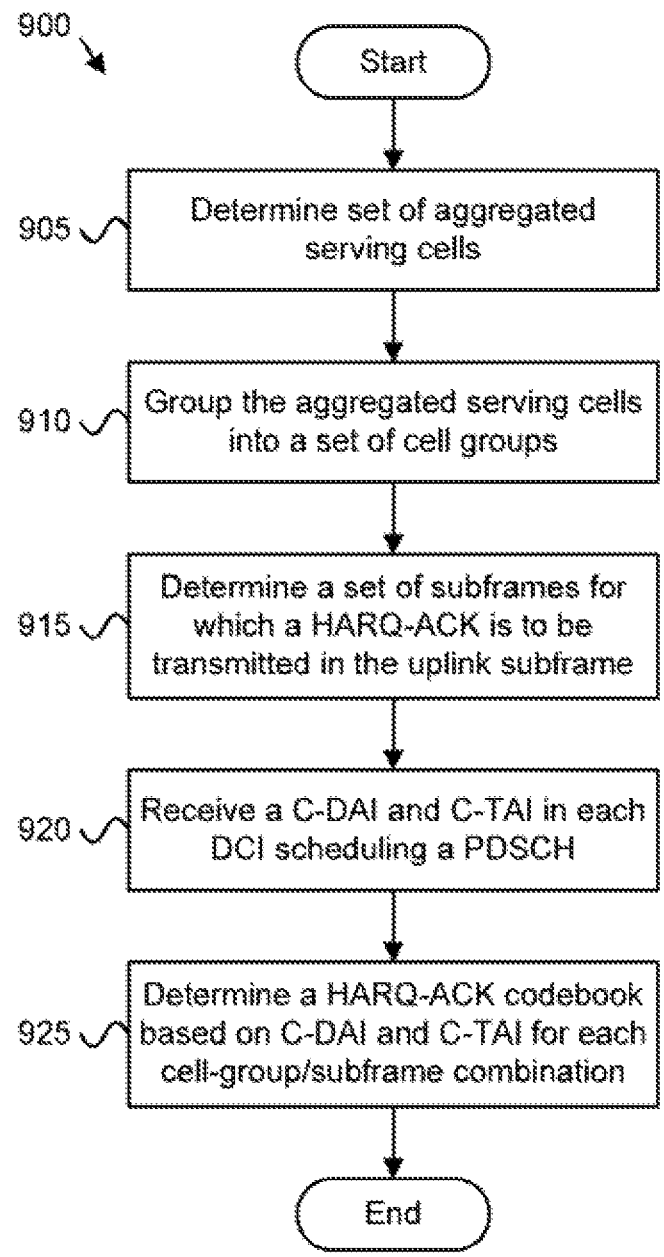
FIG. 9A is a schematic flow chart diagram illustrating one embodiment of a method for determining a HARQ-ACK codebook from a user equipment.

FIG. 9A is a schematic flow chart diagram illustrating one embodiment of a method 900 for determining a HARQ-ACK codebook by a UE 102. In some embodiments, the method 900 is performed by an apparatus, such as the UE 102. In certain embodiments, the method 900 may be performed by a processor executing program code, for example, a microcontroller, a microprocessor, a CPU, a GPU, an auxiliary processing unit, a FPGA, or the like.

The method 900 may include determining 905 a set of aggregated serving cells. The user equipment may be one of a plurality of UEs 102 served by the network equipment 104, wherein the set of serving cells are aggregated by the UE 102 for receiving DL communications signals on the aggregated serving cells. In some embodiments, the number and set of aggregated serving cells are configured by higher layer signaling, for example via radio resource control (RRC) layer signaling.

The method 900 may include grouping 910 the aggregated serving cells into a set of cell groups. In one embodiment, grouping 910 the aggregated serving cells into cell groups includes forming cell groups based on a maximum number of transport blocks (TBs) transmittable to the user equipment on a physical downlink shared channel (PDSCH) in a serving cell within a single subframe. In a further embodiment, grouping 910 the aggregated serving cells into cell groups includes forming cell groups such that the serving cells in the same cell group have the same maximum number of TBs transmittable to the UE 102 on the PDSCH. The maximum number of TBs transmittable to the UE 102 on the PDSCH may be predetermined based on the transmission mode of the serving cell.

The method 900 may include determining 915, for an uplink (UL) subframe, a set of DL subframes (e.g., set Y comprising subframes $(y_1, y_2, \ldots, y_M)$) for which a corresponding HARQ-ACK is to be transmitted in the UL subframe by the user equipment. In some embodiments, determining 915 the set of DL subframes includes accessing a lookup table referencing a downlink association set. In other embodiments, determining 915 the set of DL subframes is based on the duplex modes and/or UL/DL configurations of the aggregated serving cells. For example, in a LTE-FDD serving cell (e.g., using FDD duplex mode), the HARQ-ACK bits transmitted in subframe n correspond to PDSCH received in subframe n−4; while in a LTE-TDD serving cell (e.g., using TDD duplex mode), the HARQ-ACK bits transmitted in subframe n correspond to PDSCH received in subframe n−k, where k belongs to the downlink-association set K, as discussed above.

The method 900 may include receiving 920 a cell-domain downlink assignment indicator (C-DAI) and a cell-domain total assignment indicator (C-TAI) in each downlink control information (DCI) scheduling a physical downlink shared channel (PDSCH). In one embodiment, the C-DAI indicates an accumulated number of serving cells with PDSCH for the user equipment, up to the serving cell on which the PDSCH, to which the C-DAI corresponds, is received. The C-DAI indicates an accumulated number of serving cells with PDSCH in the cell group and over a particular subframe. Accordingly, in certain embodiments where there are two cell groups, the C-DAI received in the first cell group indicates an accumulated number of serving cells with PDSCH within the first cell group and the C-DAI received in the second cell group indicates an accumulated number of serving cells with PDSCH within the second cell group.

In one embodiment, the C-TAI indicates a total number of serving cells with PDSCH for the user equipment in a particular subframe and within the cell group. Similar to the C-DAI, if two cell groups are present then the C-TAI received in the first cell group indicates a total number of serving cells with PDSCH within that first cell group and the C-TA! received in the second cell group indicates a total number of serving cells with PDSCH within the second cell group.

The method 900 may include determining 925 a HARQ-ACK codebook based the C-DAI and C-TAI for each combination of a cell group and a subframe, the cell group belonging to the set of cell groups and the subframe belonging to the set of subframes. The method 900 then ends. In some embodiments, determining 925 the HARQ-ACK codebook for each combination includes the UE 102 determining multiple HARQ-ACK codebooks. For example, where there are two cell groups ($CG_1$, $CG_2$) and the set of DL subframes comprising two subframes ($y_1$, $y_2$), determining 925 a HARQ-ACK codebook for each combination of a cell group and a subframe includes determining four HARQ-ACK codebooks: one each for the combinations ($CG_1$, $y_1$), ($CG_2$, $y_1$), ($CG_1$, $y_2$), and ($CG_2$, $y_2$). In certain embodiments, the UE 102 concatenates the HARQ-ACK codebooks for each combination into a final HARQ-ACK codebook and transmits to the network equipment 104 a HARQ-ACK response including the final HARQ-ACK codebook.

In some embodiments, determining 925 a HARQ-ACK codebook includes determining a HARQ-ACK codebook size based on the C-DAI and C-TAI, as well as determining a HARQ-ACK bit ordering based on the C-DAI. In certain embodiments, HARQ-ACK codebook size is specific to the cell group and the subframe, as discussed above with reference to FIGS. 6-7. The HARQ-ACK bit ordering may also be specific to the cell group and the subframe, as discussed above with reference to FIGS. 6-7.

In certain embodiments, the HARQ-ACK codebook size is determined based on the number of serving cells scheduled with PDSCH for the user equipment and on the maximum number of TBs transmittable to the user equipment on a PDSCH in a serving cell and within a single subframe. In other embodiments, the HARQ-ACK codebook size is determined based on the number of aggregated serving cells in the cell group and on the maximum number of TBs transmittable to the user equipment regardless of the number of serving cells scheduled with PDSCH. For example, in response to the number of aggregated serving cells in the cell group being below a certain threshold value, the HARQ-ACK codebook size is determined based on the number of aggregated serving cells without regard to the number of serving cells scheduled with PDSCH.

In certain embodiments, the HARQ-ACK codebook bit ordering is based on an index or identifier of the serving cell (e.g., a cell ID) and a maximum number of TBs transmittable to the user equipment on PDSCH in a serving cell and within a single subframe. For example, where A is the maximum number of transport blocks (TBs) transmittable to the user equipment on PDSCH in a serving cell of the cell group in the subframe, each serving cell in the cell group on which PDSCH was transmitted to the user equipment is allocated A-bits within the HARQ-ACK codebook in an order based on the serving cell identifier/index. Determining 925 the HARQ-ACK codebook may further include obtaining A HARQ-ACK feedback bits for each serving cell in the cell group on which PDSCH was received in the subframe and inserting the A HARQ-ACK feedback bits into the codebook at the A bit indices, for each serving cell in the cell group on which PDSCH was received in the subframe. In certain embodiments, the UE transmits the determined HARQ-ACK codebook to the network equipment 104.

Figure 9B:
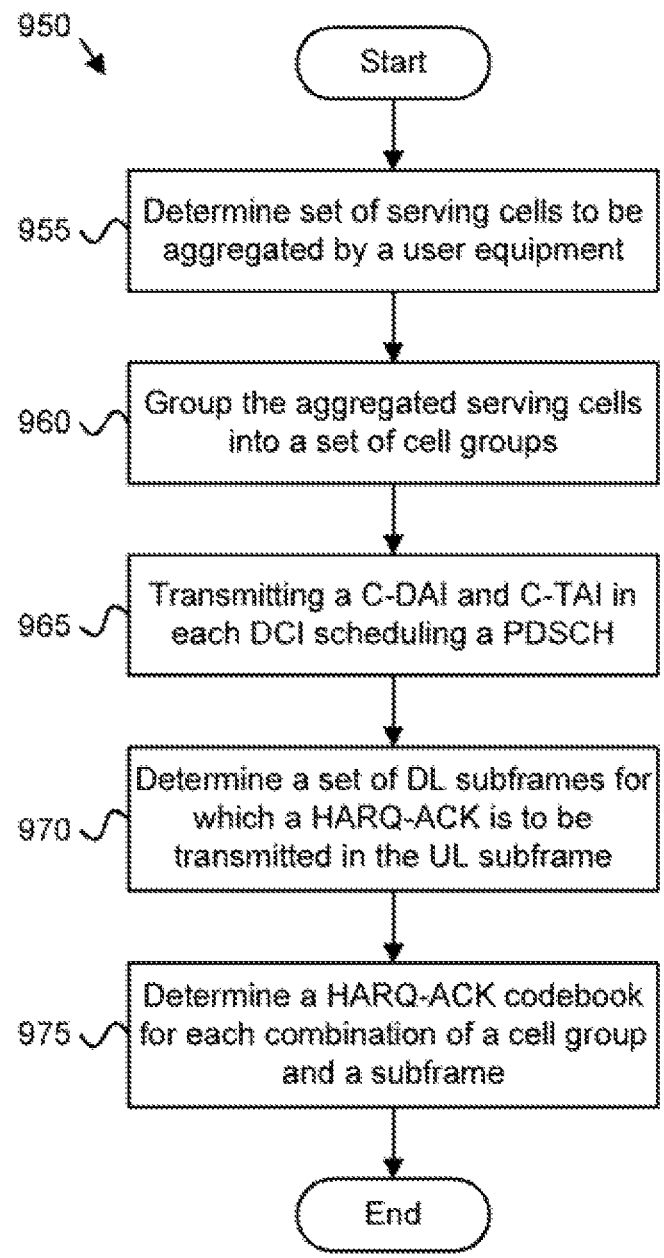
FIG. 9B is a schematic flow chart diagram illustrating one embodiment of a method for determining a HARQ-ACK codebook from a network equipment.

FIG. 9B is a schematic flow chart diagram illustrating one embodiment of a method 950 for determining a HARQ-ACK codebook by a network equipment 104. In some embodiments, the method 950 is performed by an apparatus, such as the network equipment 104. In certain embodiments, the method 950 may be performed by a processor executing program code, for example, a microcontroller, a microprocessor, a CPU, a GPU, an auxiliary processing unit, a FPGA, or the like.

The method 950 may include determining 955 a set of serving cells to be aggregated by a user equipment. The particular user equipment may be one of a plurality of UEs 102 served by the network equipment 104. The network equipment 104 may allocate a plurality of serving cells to the particular UE 102, wherein the set of serving cells are aggregated by the UE 102 for receiving DL communications signals on the plurality of serving cells and/or transmitting UL communications signals on the plurality of serving cells. The network equipment 104, therefore, determines 955 a set of serving cells to be aggregated by the particular UE 102.

The method 950 may include grouping 960 the aggregated serving cells into a set of cell groups. In one embodiment, grouping 960 the aggregated serving cells into cell groups includes forming cell groups based on a maximum number of transport blocks (TBs) transmittable to the user equipment (e.g., the particular UE 102) on a physical downlink shared channel (PDSCH) in a serving cell within a single subframe. In a further embodiment, grouping 960 the aggregated serving cells into cell groups includes forming cell groups such that the serving cells in the same cell group have the same maximum number of TBS transmittable to the UE 102 on the PDSCH. The maximum number of TBs transmittable to the UE 102 on the PDSCH may be predetermined based on the transmission mode of the serving cell.

The method 950 may include transmitting 965 a cell-domain downlink assignment indicator (C-DAI) and a cell-domain total assignment indicator (C-TAI) in each downlink control information (DCI) scheduling a PDSCH for the user equipment. In one embodiment, the C-DAI indicates an accumulated number of serving cells with PDSCH for the user equipment, up to the serving cell on which the PDSCH, to which the C-DAI corresponds, is received. The C-DAI indicates an accumulated number of serving cells with PDSCH in the cell group and over a particular subframe. Accordingly, in certain embodiments where there are two cell groups, the C-DAI received in the first cell group indicates an accumulated number of serving cells with PDSCH within the first cell group and the C-DAI received in the second cell group indicates an accumulated number of serving cells with PDSCH within the second cell group.

In one embodiment, the C-TAI indicates a total number of serving cells with PDSCH for the user equipment in a particular subframe and within the cell group. Similar to the C-DAI, if two cell groups are present then the C-TAI received in the first cell group indicates a total number of serving cells with PDSCH within that first cell group and the C-TAI received in the second cell group indicates a total number of serving cells with PDSCH within the second cell group.

The method 950 may include determining 970, for an uplink (UL) subframe, a set of DL subframes (e.g., set Y comprising subframes ($y_1, y_2, \ldots, y_M$)) for which a corresponding HARQ-ACK is to be transmitted in the UL subframe by the user equipment. In some embodiments, determining 970 the set of DL subframes includes accessing a lookup table referencing a downlink association set. In other embodiments, determining 970 the set of DL subframes is based on a duplex mode and/or a UL/DL configuration of the network equipment 104.

The method 950 may include determining 975 a HARQ-ACK codebook for each combination of a cell group and a subframe, the cell group belonging to the set of cell groups in the subframe belonging to the set of subframes. The method 950 then ends. In certain embodiments, the network equipment 104 does not determine 975 the HARQ-ACK codebook based on C-DAI and C-TAI, as the network equipment 104 already knows the number of serving cells scheduled with PDSCH in the cell group (and subframe), number of aggregated serving cells (regardless of PDSCH scheduling), and the maximum number of transport blocks (TBs) transmittable to the user equipment on PDSCH in a serving cell of the cell group within the subframe. In other embodiments, the network equipment 104 may determine 975 the HARQ-ACK codebook using the C-DAI and C-TAI similar to the UE 102, as discussed above.

In some embodiments, determining 975 the HARQ-ACK codebook for each combination includes the network equipment 104 determining multiple HARQ-ACK codebooks. For example, where there are two cell groups ($CG_1, CG_2$) and the set of DL subframes comprising three subframes ($y_1, y_2, y_3$), determining 975 a HARQ-ACK codebook for each combination of a cell group and a subframe includes determining six HARQ-ACK codebooks: one each for the combinations: ($CG_1, y_1$), ($CG_2, y_1$), ($CG_1, y_2$), ($CG_2, y_2$), ($CG_1, y_3$), and ($CG_2, y_3$). In certain embodiments, the HARQ-ACK codebooks for each combination are then concatenated into a final HARQ-ACK codebook.

In some embodiments, determining 975 a HARQ-ACK codebook includes determining the HARQ-ACK codebook size and the HARQ-ACK bit ordering. In certain embodiments, HARQ-ACK codebook size is specific to the cell group and the subframe, as discussed above with reference to FIGS. 6-7. The HARQ-ACK bit ordering may also be specific to the cell group and the subframe, as discussed above with reference to FIGS. 6-7.

In certain embodiments, the HARQ-ACK codebook size is determined based on the number of serving cells scheduled with PDSCH for the user equipment and on the maximum number of TBs transmittable to the user equipment on a PDSCH in a serving cell and within a single subframe. In other embodiments, the HARQ-ACK codebook size is determined based on the number of aggregated serving cells in the cell group and on the maximum number of TBs transmittable to the user equipment regardless of the number of serving cells scheduled with PDSCH. For example, in response to the number of aggregated serving cells in the cell group being below a certain threshold value, the HARQ-ACK codebook size is determined based on the number of aggregated serving cells without regard to the number of serving cells scheduled with PDSCH.

In certain embodiments, the HARQ-ACK codebook bit ordering is based on an index or identifier of the serving cell (e.g., a cell ID) and a maximum number of TBs transmittable to the user equipment on PDSCH in a serving cell and within a single subframe. For example, where A is the maximum number of transport blocks (TBs) transmittable to the user equipment on PDSCH in a serving cell of the cell group in the subframe, each serving cell in the cell group on which PDSCH was transmitted to the user equipment is allocated A-bits within the HARQ-ACK codebook in an order based on the serving cell identifier/index.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
   determining a set of aggregated serving cells;
   grouping the aggregated serving cells into a set of cell groups;
   determining, for an uplink (UL) subframe, a set of subframes Y comprising subframes $(y_1, y_2, \ldots, y_M)$ for which a corresponding hybrid automatic repeat request acknowledgement (HARQ-ACK) is to be transmitted in the UL subframe;
   receiving a cell-domain downlink assignment indicator (C-DAI) and a cell-domain total assignment indicator (C-TAI) in each downlink control information (DCI) scheduling a physical downlink shared channel (PDSCH); and
   determining a HARQ-ACK codebook based the C-DAI and C-TAI for each combination of a cell group and a subframe, the cell group belonging to the set of cell groups and the subframe belonging to the set of subframes.

2. The method of claim 1, further comprising concatenating the HARQ-ACK codebooks from all cell groups and all subframes, in response to the set of cell groups containing more than one cell group or the set of subframes Y containing more than one subframe.

3. The method of claim 1, wherein, for a serving cell x of the aggregated serving cells, the corresponding C-DAI indicates an accumulated number of serving cells with PDSCH up to the serving cell x in a subframe $y_m$ and in the cell group containing serving cell x, and wherein the corresponding C-TAI indicates the total number of serving cells with PDSCH in the subframe $y_m$ and in the cell group containing serving cell x, wherein the serving cells in the cell group and in the subframe $y_m$ are ordered according to a pre-determined rule.

4. The method of claim 1, wherein grouping the aggregated serving cells into cell groups comprises grouping the aggregated serving cells into cell groups based on a maximum number of transport blocks (TBs) transmittable on the PDSCH in a serving cell within a subframe $y_m$, wherein the serving cells in the same cell group have the same maximum number of TBs transmittable on the PDSCH.

5. The method of claim 1, wherein determining the HARQ-ACK codebook for a combination of a cell group of the set of cell groups and a subframe of the set of subframes based on the C-DAI and C-TAI comprises:
   determining the HARQ-ACK codebook size for the cell group in the subframe using the C-TAI and the C-DAI for the cell group in the subframe; and
   determining the HARQ-ACK bit ordering for the cell group in the subframe using the C-DAI for the cell group in the subframe.

6. The method of claim 5, wherein determining the HARQ-ACK codebook size for the cell group in the subframe comprises:
   obtaining a value Z, denoting the number of serving cell pairs (g', g'') with $I_{C\text{-}DAI,g''} \leq I_{C\text{-}DAI,g'}$, wherein $g' < g''$ and serving cell j(g') and j(g'') are two serving cells in the cell group on which PDSCH is received in the subframe and there is no other $g' < g''' < g''$ in the cell group such that PDSCH is received on serving cell j(g''') in the subframe, and wherein $I_{C\text{-}DAI,g}$ is the value of the C-DAI corresponding to the serving cell j(g) in the subframe, and the serving cell index for a serving cell in the cell group is denoted as j(g) with $1 \leq g \leq |CG|$ and $|CG|$ is the number of serving cells in the cell group;
   setting the value of $K = Z+1$ in response to $U > Z \hat{\times} 2^{(Q)} + I_{C\text{-}TAI}$ and setting the value of $K = Z$ otherwise, wherein U is the number of received PDSCH in the cell group and in the subframe, wherein the C-DAI and C-TAI in the DCI comprises Q bits each, and $I_{C\text{-}TAI}$ is the value of the C-TAI corresponding to the serving cell(s) in the cell group; and
   calculating the HARQ-ACK codebook size for the cell group in the subframe as $[K \hat{\times} 2^{(Q)} + I_{C\text{-}TAI}] \times A$, wherein A is the maximum number of transport blocks (TBs) transmittable on PDSCH in a serving cell of the cell group within the subframe.

7. The method of claim 5, wherein determining the HARQ-ACK bit ordering for the cell group in the subframe comprises:
   setting the value of $K_g$ as the number of serving cell pairs (g', g'') with $I_{C\text{-}DAI,g''} \leq I_{C\text{-}DAI,g'}$, wherein $g' < g'' \leq g$ and serving cell j(g') and j(g'') are two serving cells in the cell group on which a PDSCH is received in the subframe and there is no other serving cell j(g''') in the cell group, wherein $g' < g''' < g''$, such that a PDSCH is received on serving cell j(g''') in the subframe, and wherein PDSCH is received on serving cell j(g) in the subframe, and the serving cell index for a serving cell in the cell group is denoted as j(g) with $1 \leq g \leq |CG|$ and $|CG|$ is the number of serving cells in the cell group; and
   inserting the A HARQ-ACK feedback bits corresponding to the PDSCH received on serving cell j(g) in the $((K_g \hat{\times} 2^{Q_{C\text{-}DAI} + I_{C\text{-}DAI,g}} - 1) \times A + 1)$-th to $((K_g \hat{\times} 2^{Q_{C\text{-}DAI} + I_{C\text{-}DAI,g}}) \times A)$-th bit position, wherein A is the maximum number of transport blocks (TBs) transmittable on PDSCH in a serving cell of the cell group within the subframe.

8. The method of claim 5, wherein determining the HARQ-ACK codebook size for the cell group in the subframe comprises:
   for each subframe $y_m$ in the set Y, obtaining a value $Z_m$, denoting the number of serving cell pairs (g', g'') in the subframe $y_m$ with $I_{C\text{-}DAI,g''} \leq I_{C\text{-}DAI,g'}$, wherein $g' < g'' \leq g$ and serving cell j(g') and j(g'') are two serving cells in the cell group on which PDSCH is received in the subframe $y_m$ and there is no other $g' < g''' < g''$ in the cell group such that PDSCH is received on serving cell j(g''') in the subframe $y_m$, and wherein $I_{C\text{-}DAI,g}$ is the value of the C-DAI corresponding to the serving cell j(g) in subframe $y_m$, and the serving cell index for a serving cell in the cell group is denoted as j(g) with $1 \leq g \leq |CG|$ and $|CG|$ is the number of serving cells in the cell group;
   for each subframe $y_m$ in the set Y, setting the value of $K_m = Z_m + 1$ in response to $U_m > Z_m \hat{\times} 2^{(Q)} + I_{C\text{-}DAI,m}$ and setting the value of $K_m = Z_m$ otherwise, wherein $U_m$ is the number of received PDSCH in the cell group and in subframe $y_m$, wherein the C-DAI and C-TAI in the DCI comprises Q bits each, and $I_{C,TAI,m}$ is the value of C-TAI in the cell group and in subframe $y_m$; and
   determining the HARQ-ACK codebook size for the cell group in the subframe as $$\max_{m=1,2,\ldots,M} (K_m \times 2 \wedge Q + I_{C\text{-}TALm}) \times A,$$

wherein A is the maximum number of transport blocks (TBs) transmittable on PDSCH in a serving cell of the cell group within a subframe in the set Y.

9. The method of claim 5, wherein determining the HARQ-ACK codebook size for the cell group in the subframe comprises determining the HARQ-ACK codebook size for the cell group in the subframe based on the number of aggregated serving cells in the cell group and the maximum number of transport blocks (TBs) transmittable on PDSCH in a serving cell of the cell group within the subframe, in response to the number of aggregated serving cells in the cell group being below a certain threshold value, wherein the threshold value is either configured by higher layers or fixed in specification.

10. The method of claim 1, further comprising setting a negative acknowledgment in each HARQ-ACK feedback bit position of the set of HARQ-ACK feedback bit positions for which there is no corresponding received PDSCH.

11. The method of claim 1, wherein the set of subframes Y for which a corresponding HARQ-ACK is to be transmitted is based on a duplex mode and an uplink/downlink (UL/DL) configuration of each serving cell in the set of aggregated serving cells.

12. A user equipment comprising:
a radio transceiver that communicates over a mobile telecommunications network;
a processor; and
a memory that stores code executable by the processor, the code comprising:
code that determines a set of aggregated serving cells;
code that groups the aggregated serving cells into a set of cell groups;
code that determines, for an uplink (UL) subframe, a set of subframes for which a corresponding hybrid automatic repeat request acknowledgement (HARQ-ACK) is to be transmitted in the UL subframe;
code that receives, via the radio transceiver, a cell-domain downlink assignment indicator (C-DAI) and a cell-domain total assignment indicator (C-TAI) in each downlink control information (DCI) scheduling a physical downlink shared channel (PDSCH); and
code that determines a HARQ-ACK codebook based the C-DAI and C-TAI for each combination of a cell group and a subframe, the cell group belonging to the set of cell groups and the subframe belonging to the set of subframes.

13. The user equipment of claim 12, further comprising code that concatenates the HARQ-ACK codebooks from all cell groups and all subframes, in response to the set of cell groups containing more than one cell group or the set of subframes containing more than one subframe.

14. The user equipment of claim 12, wherein, for a serving cell x of the aggregated serving cells, the corresponding C-DAI indicates an accumulated number of serving cells with PDSCH up to the serving cell x in a subframe and in the cell group containing serving cell x, and wherein the corresponding C-TAI indicates the total number of serving cells with PDSCH in the subframe and in the cell group containing serving cell x, wherein the serving cells in the cell group and in the subframe are ordered according to a pre-determined rule.

15. The user equipment of claim 12, wherein grouping the aggregated serving cells into cell groups comprises grouping the aggregated serving cells into cell groups based on a maximum number of transport blocks (TBs) transmittable on the PDSCH in a serving cell within a subframe belonging to the set of subframes, wherein the serving cells in the same cell group have the same maximum number of TBs transmittable on the PDSCH.

16. The user equipment of claim 12, wherein determining the HARQ-ACK codebook for a combination of a cell group of the set of cell groups and a subframe of the set of subframes based on the C-DAI and C-TAI comprises:
determining the HARQ-ACK codebook size for the cell group in the subframe using the C-DAI and the C-TAI for the cell group in the subframe; and
determining the HARQ-ACK bit ordering for the cell group in the subframe using the C-DAI for the cell group in the subframe.

17. The user equipment of claim 16, wherein determining the HARQ-ACK codebook size for the cell group in the subframe comprises:
determining a number of serving cells with PDSCH in the subframe;
determining a maximum number of transport blocks (TBs) transmitted on a PDSCH in a serving cell of the cell group within the subframe, and
calculating the HARQ-ACK codebook size for the cell group in the subframe as I×A, wherein I is the number of serving cells in the cell group with PDSCH in the subframe, and wherein A is the maximum number of transport blocks (TBs) transmittable on PDSCH in a serving cell of the cell group within the subframe.

18. The user equipment of claim 16, wherein determining the HARQ-ACK codebook size for the cell group in the subframe comprises determining the HARQ-ACK codebook size for the cell group in the subframe based on the number of aggregated serving cells in the cell group and the maximum number of transport blocks (TBs) transmittable on PDSCH in a serving cell of the cell group within the subframe, in response to the number of aggregated serving cells in the cell group being below a certain threshold value, wherein the threshold value is either configured by higher layers or fixed in specification.

19. The user equipment of claim 16, wherein determining the HARQ-ACK bit ordering for the cell group in the subframe comprises:
identifying A bit indices within the HARQ-ACK codebook for each serving cell in the cell group on which PDSCH was received, wherein A is the maximum number of transport blocks (TBs) transmittable on PDSCH in a serving cell of the cell group in the subframe;
obtaining A HARQ-ACK feedback bits for each serving cell in the cell group on which PDSCH was received in the subframe; and
inserting the A HARQ-ACK feedback bits into the codebook at the A bit indices, for each serving cell in the cell group on which PDSCH was received in the subframe.

20. A network equipment comprising:
a radio transceiver configured to communicate with at least one user equipment over a mobile telecommunications network;
a processor; and
a memory that stores code executable by the processor, the code comprising:
code that determines a set of serving cells to be aggregated by a user equipment;

code that groups the aggregated serving cells into a set of cell groups;

code that transmits, via the radio transceiver, a cell-domain downlink assignment indicator (C-DAI) and a cell-domain total assignment indicator (C-TAI) in each downlink control information (DCI) scheduling a physical downlink shared channel (PDSCH) for the user equipment;

code that determines, for an uplink (UL) subframe a set of subframes for which a corresponding hybrid automatic repeat request acknowledgement (HARQ-ACK) is to be transmitted by the user equipment in the UL subframe; and code that determines a HARQ-ACK codebook for each combination of a cell group and a subframe, the cell group belonging to the set of cell groups and the subframe belonging to the set of subframes.

21. The network equipment of claim 20, wherein, for a serving cell x of the aggregated serving cells, the corresponding C-DAI indicates an accumulated number of serving cells with PDSCH for the user equipment up to the serving cell x in a subframe and in the cell group containing serving cell x, and wherein the corresponding C-TAI indicates the total number of serving cells with PDSCH for the user equipment in the subframe and in the cell group containing serving cell x, wherein the serving cells in the cell group and in the subframe are ordered according to a pre-determined rule.

22. The network equipment of claim 20, wherein grouping the aggregated serving cells into cell groups comprises grouping the aggregated serving cells into cell groups based on a maximum number of transport blocks (TBs) transmittable to the user equipment on the PDSCH in a serving cell within a subframe belonging to the set of subframes, wherein the serving cells in the same cell group have the same maximum number of TBs transmittable to the user equipment on the PDSCH.

23. The network equipment of claim 20, wherein determining the HARQ-ACK codebook for a combination of a cell group and a subframe comprises:
determining the HARQ-ACK codebook size for the cell group in the subframe; and
determining the HARQ-ACK bit ordering for the cell group in the subframe.

24. The network equipment of claim 23, wherein determining the HARQ-ACK codebook size for the cell group in the subframe comprises determining the HARQ-ACK codebook size for the cell group in the subframe based on the number of aggregated serving cells in the cell group and the maximum number of transport blocks (TBs) transmittable to the user equipment on PDSCH in a serving cell of the cell group within the subframe, in response to the number of aggregated serving cells in the cell group being below a certain threshold value, wherein the threshold value is either configured by higher layers or fixed in specification.

25. The network equipment of claim 23, wherein determining the HARQ-ACK codebook size for the cell group in the subframe comprises:
determining a number of serving cells on which PDSCH is transmitted to the user equipment in the subframe;
determining a maximum number of transport blocks (TBs) transmittable to the user equipment on a PDSCH in a serving cell of the cell group within the subframe; and
calculating the HARQ-ACK codebook size for the cell group in the subframe as I×A, wherein I is the number of serving cells in the cell group with PDSCH for the user equipment in the subframe, and wherein A is the maximum number of TBs transmittable to the user equipment on PDSCH in a serving cell of the cell group within the subframe.

26. The network equipment of claim 23, wherein determining the HARQ-ACK bit ordering for the cell group in the subframe comprises:
identifying A bit indices within the HARQ-ACK codebook for each serving cell in the cell group on which PDSCH was transmitted to the user equipment, wherein A is the maximum number of transport blocks (TBs) transmittable to the user equipment on PDSCH in a serving cell of the cell group in the subframe.

27. A method comprising:
determining a set of serving cells to be aggregated by a user equipment;
grouping the aggregated serving cells into a set of cell groups;
transmitting a cell-domain downlink assignment indicator (C-DAI) and a cell-domain total assignment indicator (C-TAI) in each downlink control information (DCI) scheduling a physical downlink shared channel (PDSCH) for the user equipment;
determining, for an uplink (UL) subframe, a set of subframes Y comprising subframes $(y_1, y_2, \ldots, y_M)$ for which a corresponding hybrid automatic repeat request acknowledgement (HARQ-ACK) is to be transmitted in the UL subframe by the user equipment; and
determining a HARQ-ACK codebook for each combination of a cell group and a subframe $y_m$, the cell group belonging to the set of cell groups.

28. The method of claim 27, wherein, for a serving cell x of the aggregated serving cells, the corresponding C-DAI indicates an accumulated number of serving cells with PDSCH for the user equipment up to the serving cell x in a subframe $y_m$ and in the cell group containing serving cell x, and wherein the corresponding C-TAI indicates the total number of serving cells with PDSCH for the user equipment in the subframe $y_m$ and in the cell group containing serving cell x, wherein the serving cells in the cell group and in the subframe $y_m$ are ordered according to a pre-determined rule.

29. The method of claim 27, wherein grouping the aggregated serving cells into cell groups comprises grouping the aggregated serving cells into cell groups based on a maximum number of transport blocks (TBs) transmittable to the user equipment on the PDSCH in a serving cell within a subframe $y_m$, wherein the serving cells in the same cell group have the same maximum number of TBs transmittable to the user equipment on the PDSCH.

30. The method of claim 27, wherein determining the HARQ-ACK codebook for a combination of a cell group and a subframe comprises:
determining the HARQ-ACK codebook size for the cell group in the subframe; and
determining the HARQ-ACK bit ordering for the cell group in the subframe.

31. The method of claim 30, wherein determining the HARQ-ACK codebook size for the cell group in the subframe comprises determining the HARQ-ACK codebook size for the cell group in the subframe based on the number of aggregated serving cells in the cell group and the maximum number of transport blocks (TBs) transmittable to the user equipment on PDSCH in a serving cell of the cell group within the subframe, in response to the number of aggregated serving cells in the cell group being below a certain threshold value, wherein the threshold value is either configured by higher layers or fixed in specification.

32. The method of claim 30, wherein determining the HARQ-ACK codebook size for the cell group in the subframe comprises:

determining a number of serving cells on which PDSCH is transmitted to the user equipment in the subframe;

determining a maximum number of transport blocks (TBs) transmittable to the user equipment on a PDSCH in a serving cell of the cell group within the subframe; and calculating the HARQ-ACK codebook size for the cell group in the subframe as I×A, wherein I is the number of serving cells in the cell group with PDSCH for the user equipment in the subframe, and wherein A is the maximum number of TBs transmittable to the user equipment on PDSCH in a serving cell of the cell group within the subframe.

33. The method of claim 30, wherein determining the HARQ-ACK bit ordering for the cell group in the subframe comprises:

identifying A bit indices within the HARQ-ACK codebook for each serving cell in the cell group on which PDSCH was transmitted to the user equipment, wherein A is the maximum number of transport blocks (TBs) transmittable to the user equipment on PDSCH in a serving cell of the cell group in the subframe.

\* \* \* \* \*

UNITED STATES PATENT AND TRADEMARK OFFICE
CERTIFICATE OF CORRECTION

PATENT NO. : 10,341,057 B2
APPLICATION NO. : 15/752560
DATED : July 2, 2019
INVENTOR(S) : Zukang Shen Page 1 of 2

It is certified that error appears in the above-identified patent and that said Letters Patent is hereby corrected as shown below:

In the Claims

In Column 37, Line 56:
"determining the HARQ-ACK codebook size"
Should read:
"determining a HARQ-ACK codebook size,"

In Column 37, Line 59:
"determining the HARQ-ACK bit ordering"
Should read:
"determining a HARQ-ACK bit ordering,"

In Column 38, Lines 21-22:
"determining the HARQ-ACK bit ordering"
Should read:
"determining the HARQ-ACK codebook bit ordering,"

In Column 40, Line 13:
"determining the HARQ-ACK codebook size"
Should read:
"determining a HARQ-ACK codebook size,"

In Column 40, Line 16:
"determining the HARQ-ACK bit ordering"
Should read:
"determining a HARQ-ACK bit ordering,"

In Column 40, Lines 44-45:
"determining the HARQ-ACK bit ordering"

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,341,057 B2

Should read:
"determining the HARQ-ACK codebook bit ordering,"

In Column 41, Line 41:
"determining the HARQ-ACK codebook size"
Should read:
"determining a HARQ-ACK codebook size,"

In Column 41, Line 43:
"determining the HARQ-ACK bit ordering"
Should read:
"determining a HARQ-ACK bit ordering,"

In Column 42, Lines 5-6:
"determining the HARQ-ACK bit ordering"
Should read:
"determining the HARQ-ACK codebook bit ordering,"

In Column 42, Line 53:
"determining the HARQ-ACK codebook size"
Should read:
"determining a HARQ-ACK codebook size,"

In Column 42, Line 55:
"determining the HARQ-ACK bit ordering"
Should read:
"determining a HARQ-ACK bit ordering,"

In Column 43, Lines 17-18:
"determining the HARQ-ACK bit ordering"
Should read:
"determining the HARQ-ACK codebook bit ordering,"